(12) United States Patent
Wilkins

(10) Patent No.: US 9,624,772 B2
(45) Date of Patent: Apr. 18, 2017

(54) INTERNAL COMBUSTION ENGINE WITH GEAR-DRIVEN CRANKSHAFT

(75) Inventor: Larry C. Wilkins, Ft. Lauderdale, FL (US)

(73) Assignee: Wilkins IP, LLC, New Albany, IN (US)

( * ) Notice: Subject to any disclaimer, the term of this patent is extended or adjusted under 35 U.S.C. 154(b) by 827 days.

(21) Appl. No.: 13/497,523

(22) PCT Filed: Sep. 21, 2010

(86) PCT No.: PCT/US2010/049649
§ 371 (c)(1),
(2), (4) Date: Sep. 27, 2012

(87) PCT Pub. No.: WO2011/037917
PCT Pub. Date: Mar. 31, 2011

(65) Prior Publication Data
US 2013/0019836 A1    Jan. 24, 2013

Related U.S. Application Data

(60) Provisional application No. 61/244,666, filed on Sep. 22, 2009.

(51) Int. Cl.
*F02B 75/32* (2006.01)
*F01B 9/08* (2006.01)
*F01B 9/04* (2006.01)
*F16C 3/06* (2006.01)

(52) U.S. Cl.
CPC ............... *F01B 9/08* (2013.01); *F01B 9/042* (2013.01); *F16C 3/06* (2013.01)

(58) Field of Classification Search
CPC ............. F16C 7/023; F02B 75/32; F16J 1/14

USPC ................ 123/197.3, 52.4, 52.6, 53.1, 197.4
See application file for complete search history.

(56) References Cited

U.S. PATENT DOCUMENTS 1,316,437 A * 9/1919 Flood .............................. 74/30
4,407,240 A * 10/1983 Fromson ..................... 123/55.7
(Continued)

OTHER PUBLICATIONS

International Search Report from the United States Patent and Trademark Office for International Application No. PCT/US2010/049649, mailing date Nov. 3, 2010.

*Primary Examiner* — Stephen K Cronin
*Assistant Examiner* — Omar Morales
(74) *Attorney, Agent, or Firm* — Lee & Hayes, PLLC

(57) ABSTRACT

An internal combustion engine includes a cylinder block defining a cylinder and a crankshaft rotatably received by the cylinder block. The crankshaft includes a crankshaft gear and is configured to rotate along a longitudinal axis of the crankshaft. The engine further includes a piston configured to reciprocate within the cylinder between spaced stroke termination points defining a stroke of the piston. The engine also includes a connecting rod operably coupled to the piston. The connecting rod includes a gear configured to engage the crankshaft gear, wherein the crankshaft gear and the gear of the connecting rod are configured to engage one another, such that as the piston travels within the cylinder, the connecting rod rotates the crankshaft via engagement between the crankshaft gear and the gear of the connecting rod.

45 Claims, 34 Drawing Sheets

(56) References Cited

U.S. PATENT DOCUMENTS 4,907,548 A * 3/1990 Lee .................. F01B 9/047
                                              123/197.3
5,495,906 A * 3/1996 Furutani ................ 180/65.23

* cited by examiner crankshaft zero degrees crankshaft 20 degrees crankshaft 40 degrees crankshaft 120 degrees crankshaft 180 degrees crankshaft 240 degrees crankshaft 300 degrees

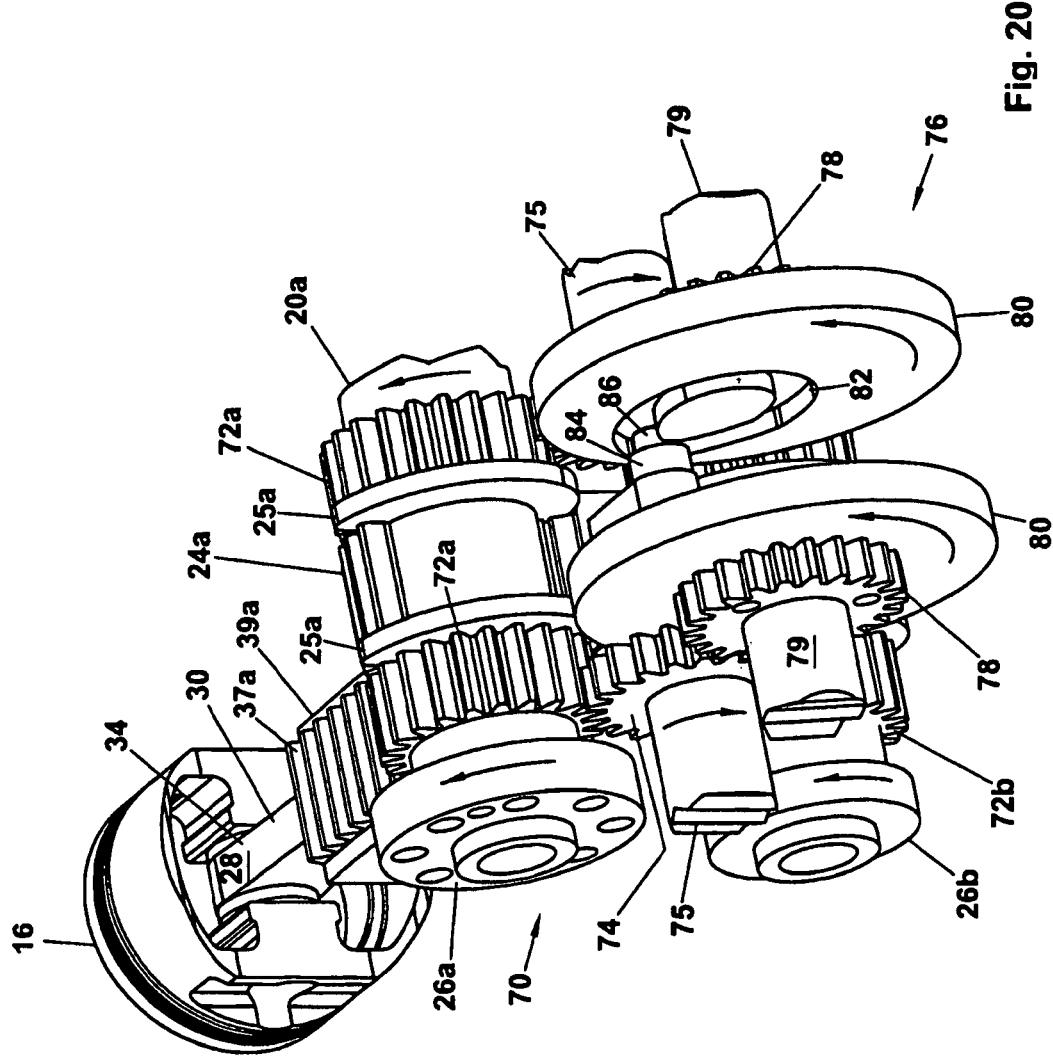

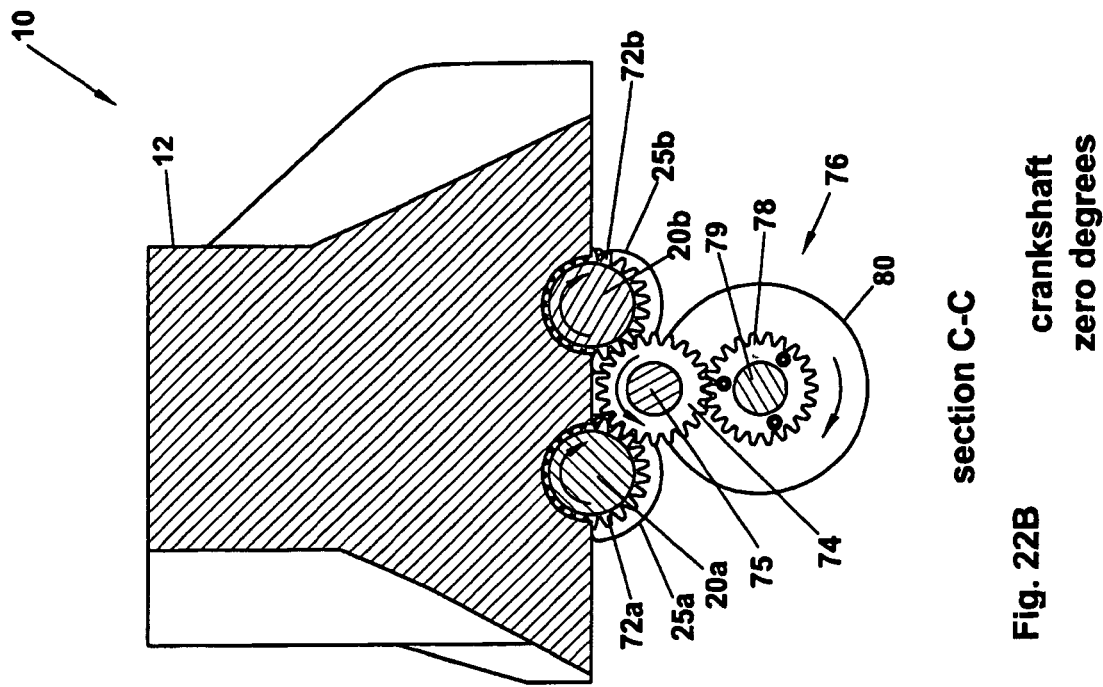
Fig. 22B  section C-C  crankshaft zero degrees
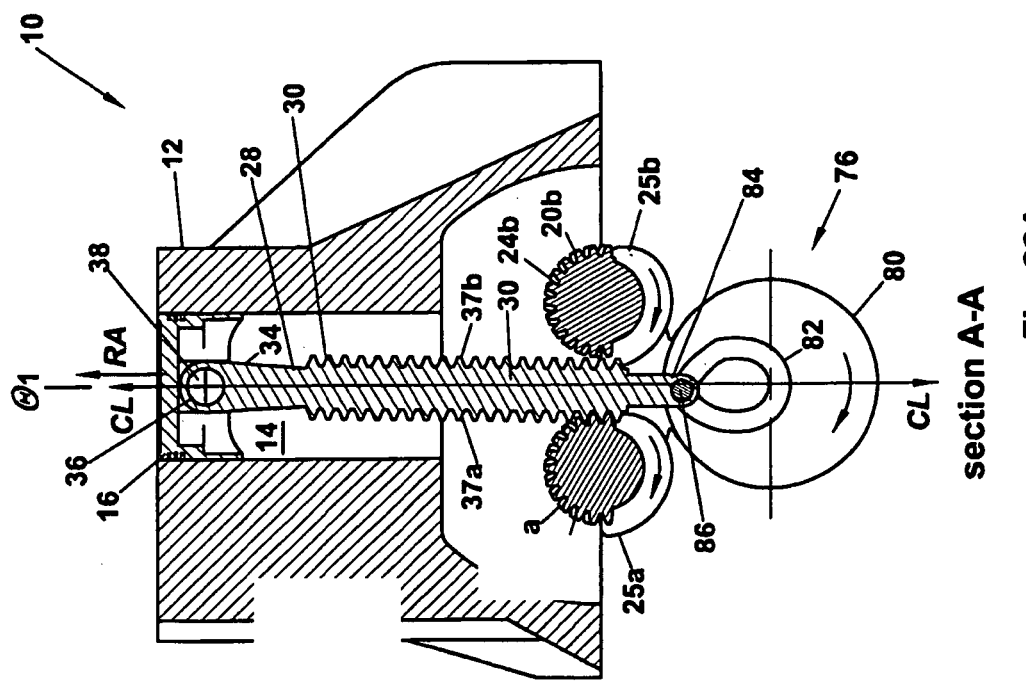
Fig. 22A  section A-A crankshaft 30 degrees crankshaft 60 degrees crankshaft 90 degrees crankshaft
120 degrees section A-A section B-B crankshaft
154 degrees crankshaft 164 degrees crankshaft 180 degrees crankshaft 270 degrees crankshaft
332 degrees

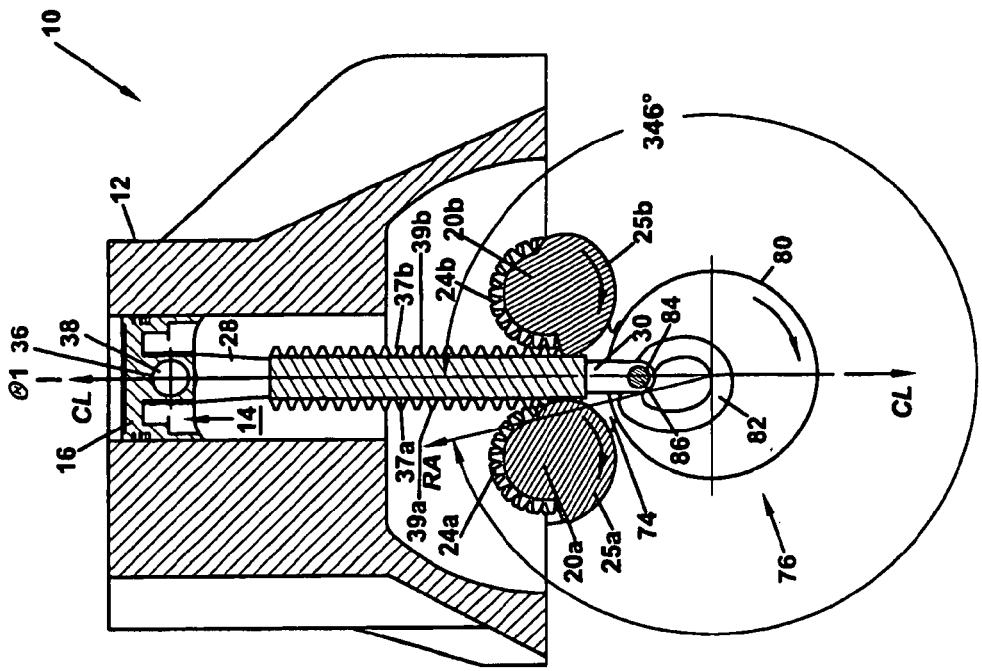
Fig. 33B    crankshaft 346 degrees
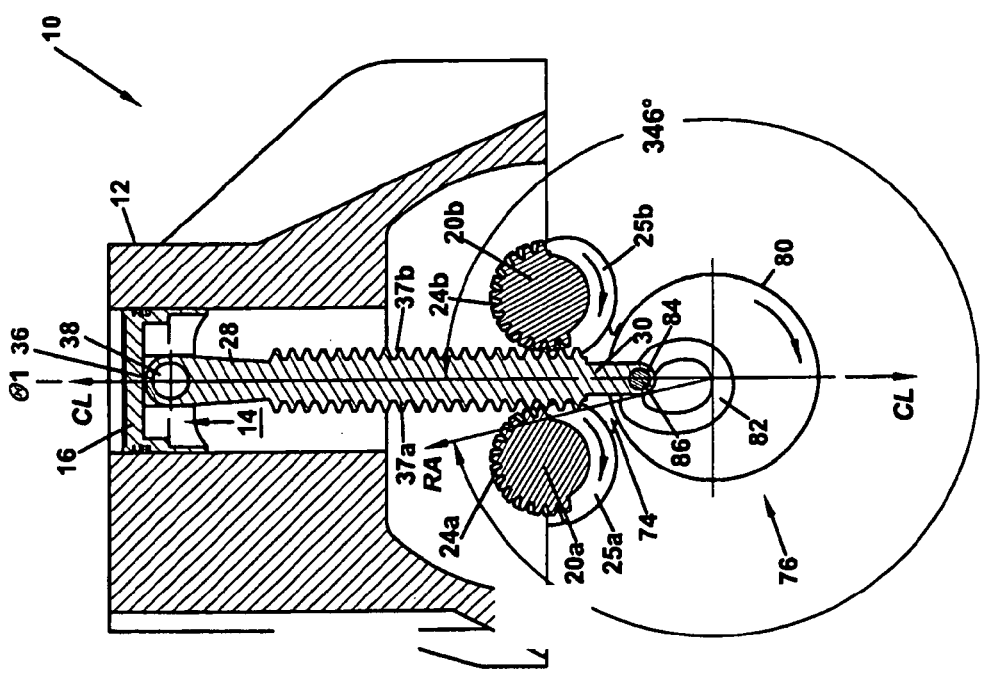
Fig. 33A

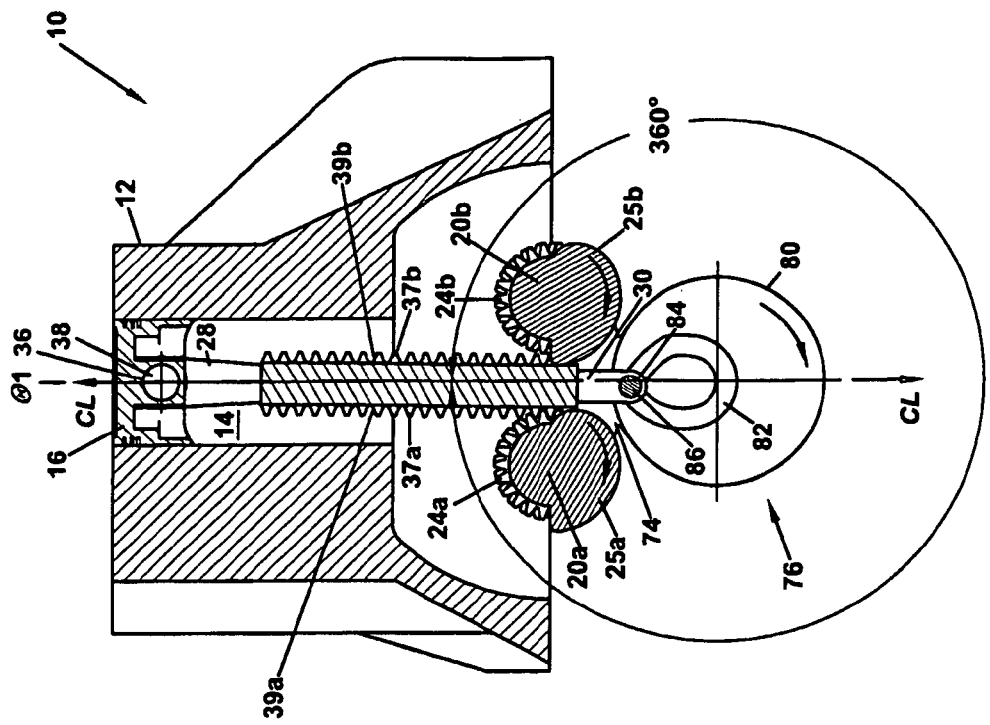
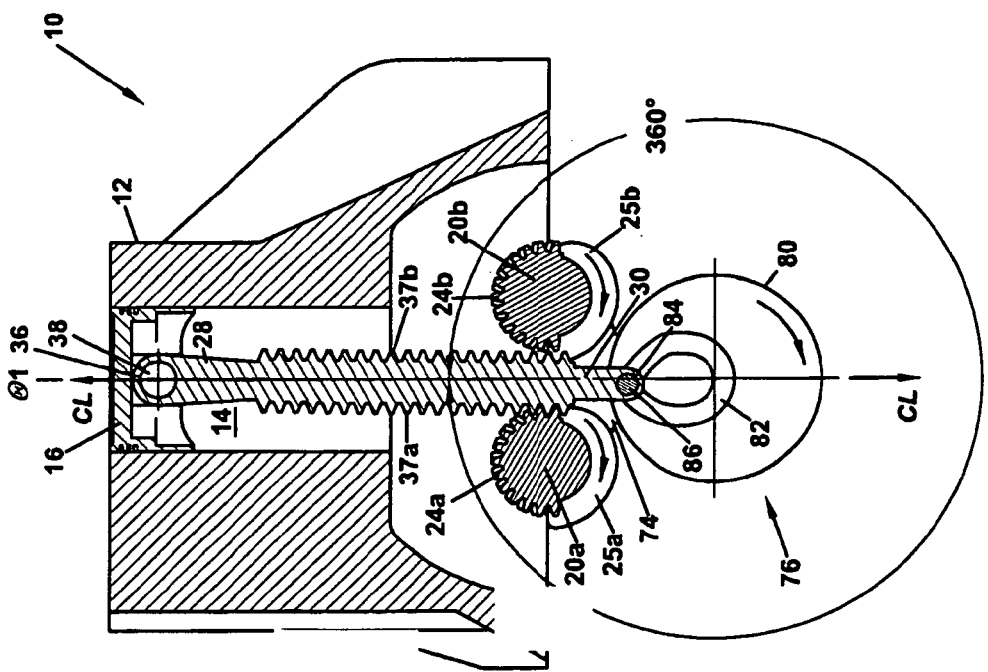
Fig. 34A

INTERNAL COMBUSTION ENGINE WITH GEAR-DRIVEN CRANKSHAFT

CLAIM OF PRIORITY/INCORPORATION BY REFERENCE

This PCT International Application claims the right of priority to, and hereby incorporates by reference herein in its entirety, U.S. Provisional Patent Application No. 61/244,666, filed Sep. 22, 2009.

FIELD OF THE DISCLOSURE

The present disclosure relates to internal combustion engines. In particular, the present disclosure relates to internal combustion engines with improved fuel efficiency and/or power output.

BACKGROUND

High fuel costs and a desire to reduce undesirable emissions associated with operation of internal combustion engines has renewed interest in improving fuel efficiency during operation. Thus, it may be desirable to improve the efficiency of conventional internal combustion engines.

A conventional internal combustion engine includes a cylinder block defining journals for receiving a crankshaft and one or more cylinders housing a piston that is operably coupled to the crankshaft at a crankpin via a connecting rod. During conventional operation, the piston reciprocates within the cylinder, such that during a power stroke of the internal combustion engine, combustion of an air/fuel mixture within a combustion chamber defined by the piston, the cylinder, and a cylinder head forces the piston toward the crankshaft. As the piston travels toward the crankshaft, the crankshaft is rotated via the connecting rod and crankpin, thereby converting the potential energy associated with the air/fuel mixture into mechanical work.

Due to the architecture of a conventional internal combustion engine, when the piston is at a position within the cylinder that coincides with the maximum compression (i.e., the combustion chamber is at its lowest volume when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) created between the axis of the connecting rod and the axis of the crankpin. As a result, the force initially created by the air/fuel mixture at the moment of combustion does not transfer as much torque to the crankshaft as it would if the length of the moment arm were greater. This situation may be particularly undesirable because during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the axis of the crankshaft during the time of maximum force on the piston, efficiency of the work generated from the combustion process may be less than desired.

Thus, it may be desirable to provide an internal combustion engine with a configuration that improves the efficiency of the internal combustion engine during operation. Further, it may be desirable to provide an internal combustion engine with a configuration that permits tailoring of desired performance characteristics.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to an internal combustion engine. The internal combustion engine may include a cylinder block defining a cylinder and a crankshaft rotatably received by the cylinder block. The crankshaft may include a crankshaft gear and may be configured to rotate along a longitudinal axis of the crankshaft. The engine may further include a piston configured to reciprocate within the cylinder between spaced stroke termination points defining a stroke of the piston. The engine may also include a connecting rod operably coupled to the piston. The connecting rod may include a gear configured to engage the crankshaft gear, wherein the crankshaft gear and the gear of the connecting rod are configured to engage one another, such that as the piston travels within the cylinder, the connecting rod rotates the crankshaft via engagement between the crankshaft gear and the gear of the connecting rod.

According to another aspect, an internal combustion engine may include a cylinder block defining a cylinder and a crankshaft rotatably received by the cylinder block. The crankshaft may include a crankshaft gear and may be configured to rotate along a longitudinal axis of the crankshaft. The engine may further include a piston, configured to reciprocate within the cylinder between spaced stroke termination points defining a stroke of the piston. The engine may also include a connecting rod operably coupled to the piston. The connecting rod may include an internal gear defining an aperture, wherein the crankshaft is received in the aperture of the internal gear such that the crankshaft gear engages the internal gear.

According to still a further aspect, an internal combustion engine may include a cylinder block defining a cylinder having a longitudinal cylinder axis, and a crankshaft rotatably received by the cylinder block. The crankshaft may include a crankshaft gear and may have a radial axis configured to rotate about a longitudinal axis of the crankshaft. The engine may further include a piston configured to reciprocate within the cylinder between spaced stroke termination points defining a stroke of the piston. The engine may also include a connecting rod operably coupled to the piston. The connecting rod may include a gear engaged with the crankshaft gear, wherein the engine is configured such that the piston reverses direction of travel upon reaching the stroke termination points. The gear of the connecting rod and the crankshaft gear may be configured such that as the crankshaft rotates, reversal of the direction of travel of the piston within the cylinder is delayed after the radial axis of the crankshaft is substantially parallel to the longitudinal cylinder axis.

According to yet another aspect, an internal combustion engine may include a cylinder block defining a cylinder. The engine may further include a first crankshaft rotatably received by the cylinder block, the first crankshaft including a first crankshaft gear and being configured to rotate along a first longitudinal axis of the first crankshaft. The engine may also include a second crankshaft rotatably received by the cylinder block, the second crankshaft including a second crankshaft gear and being configured to rotate along a second longitudinal axis of the second crankshaft. The engine may further include a piston configured to reciprocate within the cylinder between spaced stroke termination points defining a stroke of the piston. The engine may also include a connecting rod operably coupled to the piston, the connecting rod including a first gear configured to engage the first crankshaft gear, and a second gear configured to engage the second crankshaft gear in an alternating manner.

According to a further aspect, an internal combustion engine may include a cylinder block defining a cylinder, and a crankshaft rotatably received by the cylinder block. The crankshaft may include a crankshaft gear and may be configured to rotate along a longitudinal axis of the crankshaft. The engine may further include a piston configured to reciprocate within the cylinder between spaced stroke termination points defining a stroke of the piston. The engine may also include a connecting rod operably coupled to the piston, the connecting rod including a gear configured to engage the crankshaft gear. The gear of the connecting rod may engage the crankshaft gear as the piston travels in the cylinder in a first direction toward the crankshaft, and the gear of the connecting rod may disengage from the crankshaft gear as the piston reaches one of the stoke termination points.

According to still a further aspect, an internal combustion engine may include a cylinder block defining a cylinder and a crankshaft rotatably received by the cylinder block. The crankshaft may include a crankshaft gear and may be configured to rotate along a longitudinal axis of the crankshaft. The engine may further include a piston configured to reciprocate within the cylinder between spaced stroke termination points defining a stroke of the piston. The engine may also include a connecting rod operably coupled to the piston. The connecting rod may include a gear configured to engage the crankshaft gear, wherein a moment arm between the connecting rod and the longitudinal axis of the crankshaft remains substantially constant regardless of a position of the piston as the piston travels toward the crankshaft.

According to yet another aspect, an internal combustion engine may include a cylinder block defining a cylinder. The engine may further include a first crankshaft rotatably received by the cylinder block. The first crankshaft may include a first crankshaft gear and may be configured to rotate along a first longitudinal axis of the first crankshaft. The engine may also include a second crankshaft rotatably received by the cylinder block. The second crankshaft may include a second crankshaft gear and may be configured to rotate along a second longitudinal axis of the second crankshaft. The engine may further include a piston configured to reciprocate within the cylinder between spaced stroke termination points defining a stroke of the piston. The engine may also include a connecting rod operably coupled to the piston, and the connecting rod may include a first gear configured to engage the first crankshaft gear and a second gear configured to engage the second crankshaft gear, wherein the first gear of the connecting rod engages the first crankshaft gear during a power stroke of the engine, and the first gear of the connecting rod drives the first crankshaft, and wherein the second crankshaft gear drives the second gear of the connecting rod.

According to still another aspect, a crankshaft for an internal combustion engine may include an elongated member configured to be received in an internal combustion engine. The elongated member may define a longitudinal axis, and may include a plurality of journals spaced from one another along the longitudinal axis, and a plurality of gears spaced from one another along the longitudinal axis. The plurality of gears may be configured to engage respective connecting rods of the internal combustion engine.

According to still a further aspect, a connecting rod for an internal combustion engine may include a proximal portion having a gear configured to engage a crankshaft of the internal combustion engine, and a distal portion configured to be operably coupled to a piston of the internal combustion engine.

Some possible objects and advantages of the disclosure will be set forth in part in the description which follows, and in part will be obvious from the description, or may be learned by practice of the disclosed embodiments.

Aside from the structural arrangements set forth above, the embodiments could include a number of other arrangements, such as those explained hereinafter. It is to be understood that both the foregoing description and the following description are exemplary only.

BRIEF DESCRIPTION OF THE DRAWINGS

The accompanying drawings, which are incorporated in and constitute a part of this description, illustrate several exemplary embodiments and together with the description, serve to explain the principles of the embodiments. In the drawings.

FIG. 20 is a schematic partial perspective view from a third perspective of a portion of the exemplary embodiment shown in FIG. 16;

FIG. 22A is a schematic end section view taken along line A-A in FIG. 21 with a radial axis angle of the exemplary crankshafts shown at 0 degrees;

FIG. 22B is a schematic end section view taken along line C-C in FIG. 21 with the radial axis angle of the exemplary crankshafts shown at 0 degrees;

FIG. 33A is a schematic end section view taken along line A-A in FIG. 21 with the radial axis angle of the exemplary crankshafts shown at 346 degrees;

FIG. 33B is a schematic end section view taken along line B-B in FIG. 21 with the radial axis angle of the exemplary crankshafts shown at 346 degrees;

FIG. 34A is a schematic end section view taken along line A-A in FIG. 21 with the radial axis angle of the exemplary crankshafts shown at 0/360 degrees; and FIG. 34B is a schematic end section view taken along line B-B in FIG. 21 with the radial axis angle of the exemplary crankshafts shown at 0/360 degrees.

DESCRIPTION OF EXEMPLARY EMBODIMENTS

Figure 1:
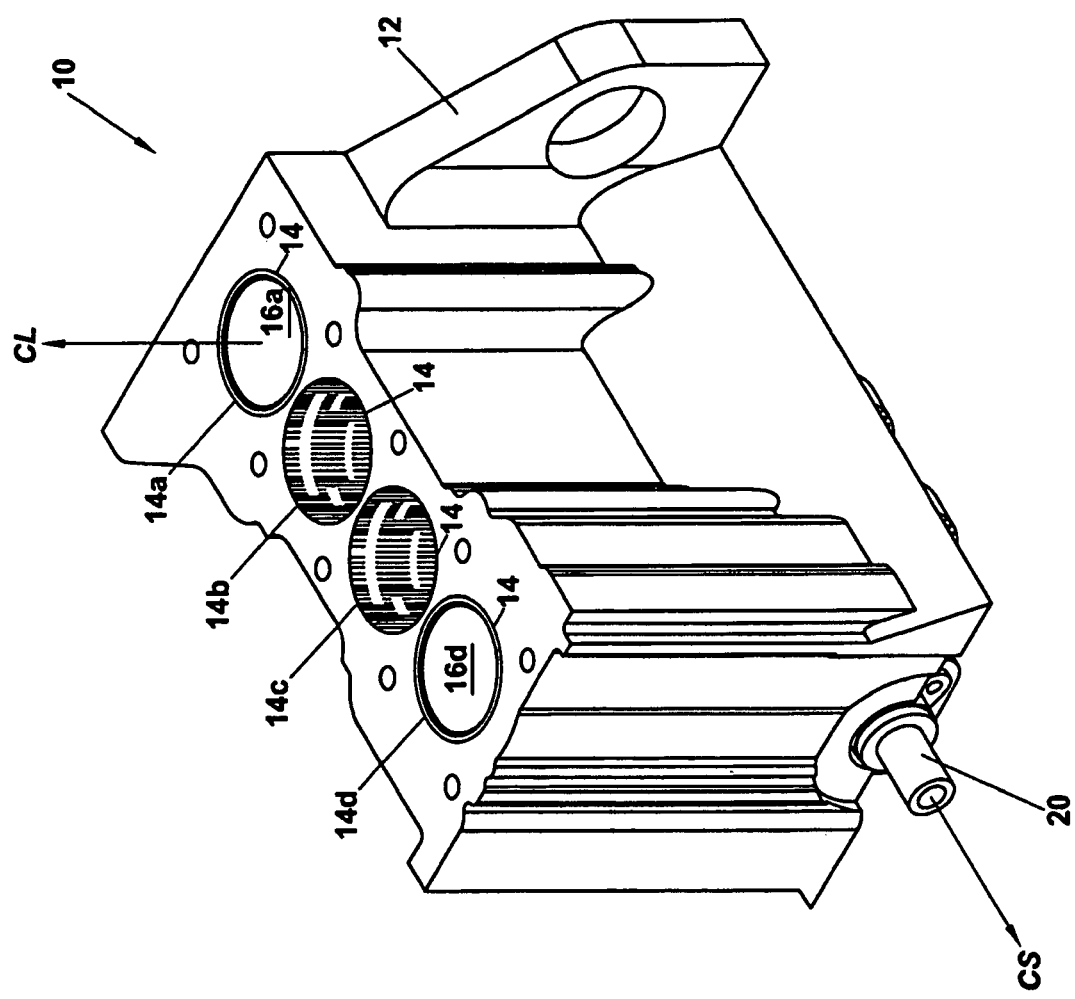
FIG. 1 is a schematic partial perspective view of an exemplary embodiment of an internal combustion engine.

Reference will now be made in detail to exemplary embodiments. Wherever possible, the same reference numbers are used in the drawings and the description to refer to the same or like parts.

FIGS. 1-15 schematically illustrate a first exemplary embodiment of an engine 10. Another exemplary, embodiment is described with respect to FIGS. 16-34B.

In the first exemplary embodiment, exemplary engine 10 is a reciprocating-piston internal combustion engine. As shown in FIG. 1, engine 10 includes a cylinder block 12 defining a number of cylinders 14, each defining a longitudinal axis CL. In the exemplary embodiment shown, engine 10 has an in-line configuration and four cylinders 14a, 14b, 14c, and 14d. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has, four cylinders, engine 10 may have other numbers of cylinders known to those skilled in the art, such as, for example, one, two, three, five, six, eight, ten, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation.

As shown in FIG. 1, exemplary engine 10 includes pistons 16 corresponding to cylinders 14, for example, four pistons 16a, 16b, 16c, and 16d (FIG. 2). As shown in FIG. 1, pistons 16a and 16d are positioned in the upper end (i.e., "upper" being relative to the orientation of engine 10 shown in FIG. 1) of cylinders 14a and 14d, respectively, while pistons 16b and 16c are not visible in FIG. 1 due to being positioned lower in the cylinders 14b and 14c, respectively. To the extent that the relative positions of the pistons 16 in the cylinders 14 tend to indicate a relative firing order of engine 10 (i.e., the sequential order of combustion events as identified by cylinders), exemplary engine 10 may be configured to have a different firing order, as is known to those skilled in the art.

Figure 3:
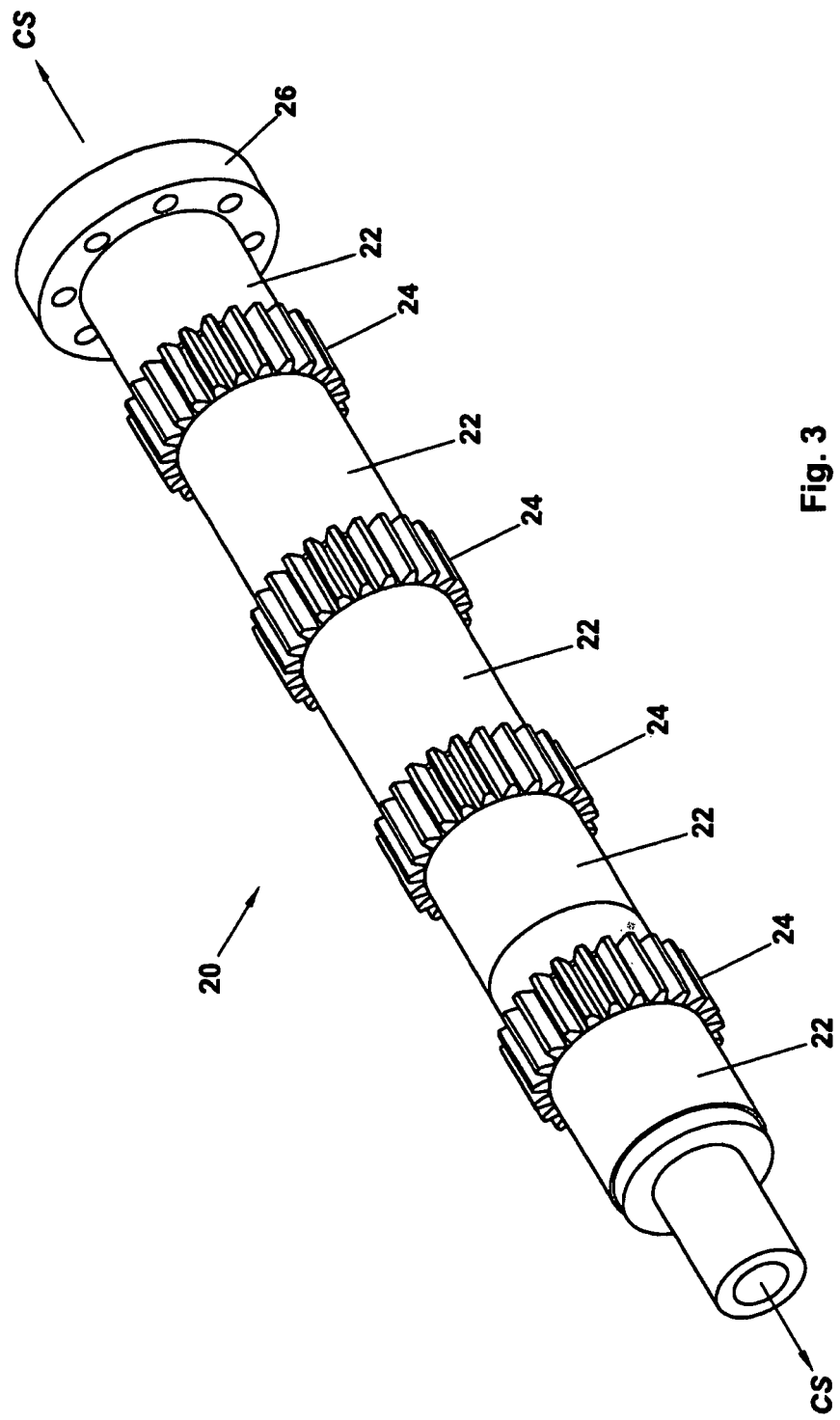
FIG. 3 is a schematic side view of an exemplary embodiment of a crankshaft for the exemplary embodiment shown in FIG. 1.
Figure 4:
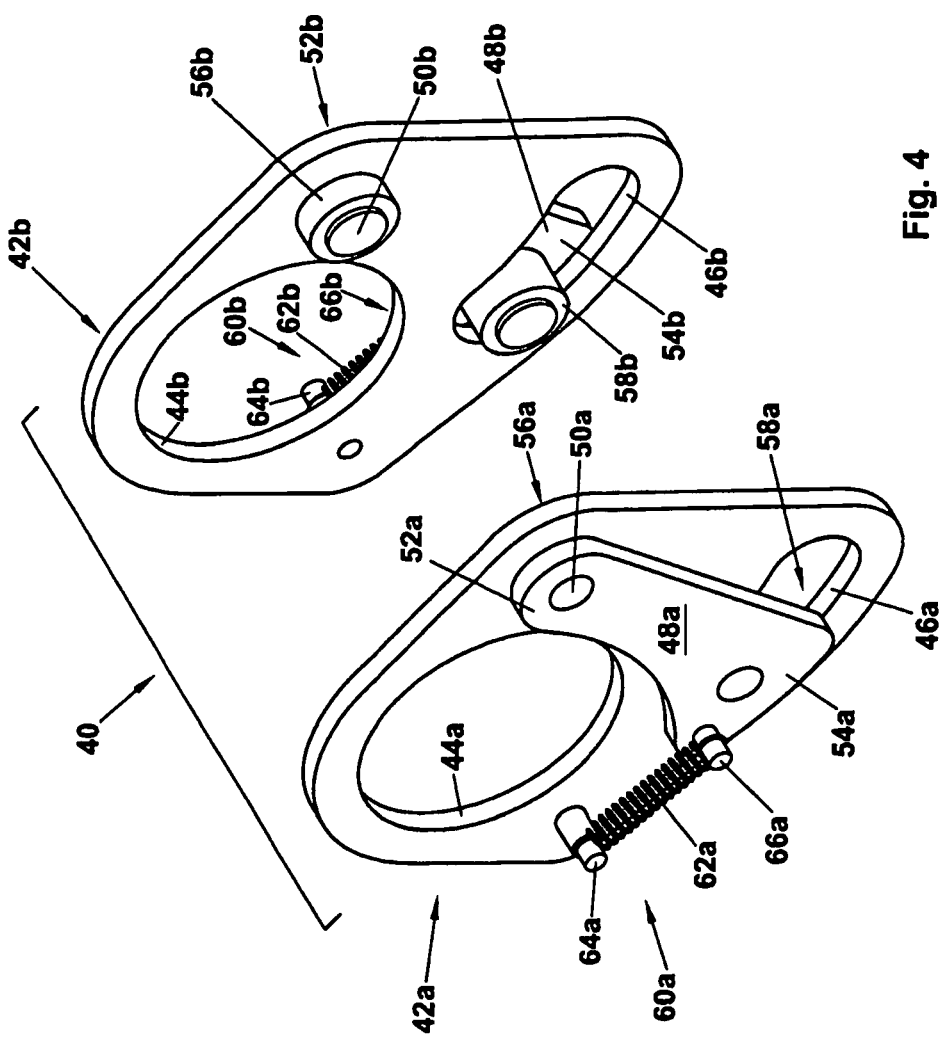
FIG. 4 is a schematic partial perspective view of plates in a retainer assembly of the exemplary embodiment shown in FIG. 1.
Figure 5:
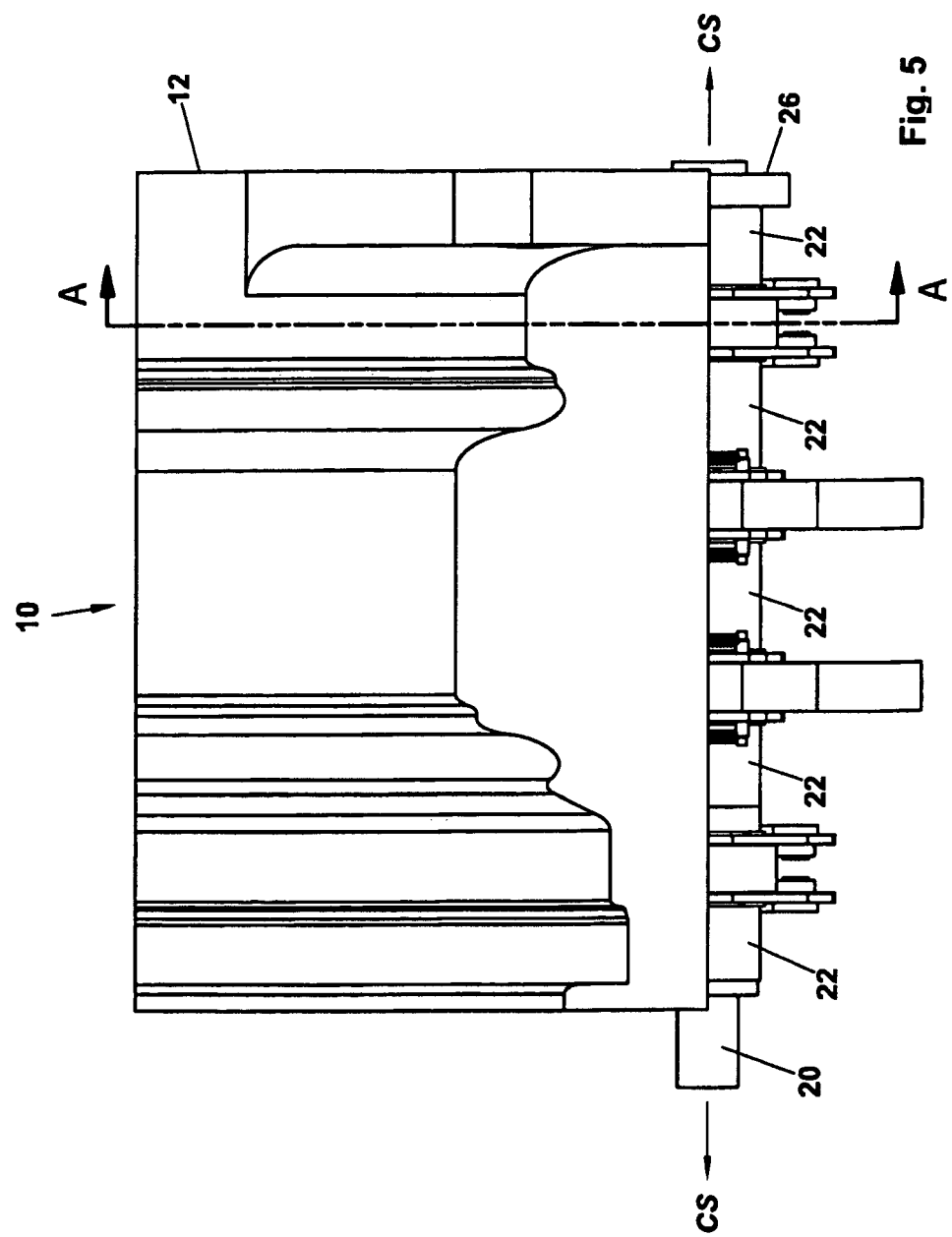
FIG. 5 is a schematic side view of the exemplary embodiment shown in FIG. 1.

Cylinder block 12 of exemplary engine 10 defines a number of bearings (not shown) for receiving a crankshaft 20, such that crankshaft 20 may rotate relative to cylinder block 12 along a longitudinal axis CS defined by crankshaft 20. For example, as shown in FIGS. 3 and 5, crankshaft 20 is an elongated member that defines a number of journals 22 corresponding to the number of bearings defined by cylinder block 12, and journals 22 are received by bearings 18, such that crankshaft 20 may rotate about longitudinal axis CS. Exemplary crankshaft 20 further includes a number of crankshaft gears 24 corresponding to the number of cylinders. In addition, crankshaft 20 may further include a flange 26 configured to operably couple exemplary engine 10 to a power train (not shown).

Figures 2A, 2B:
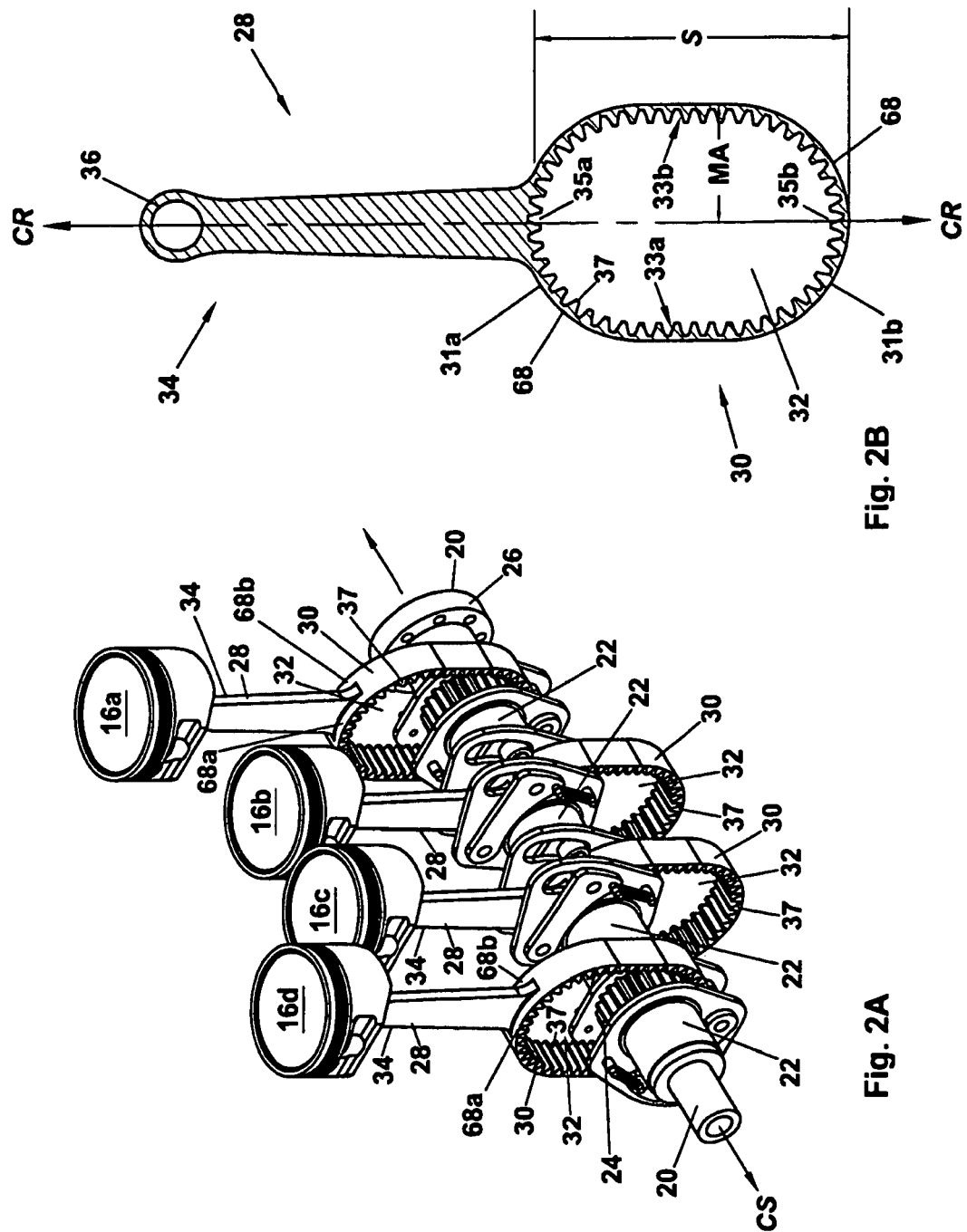
FIG. 2A is a schematic partial perspective view of a portion of the exemplary embodiment shown in FIG. 1.
FIG. 2B is a schematic side view of an exemplary connecting rod of the exemplary embodiment shown in FIG. 1.
Figure 6:
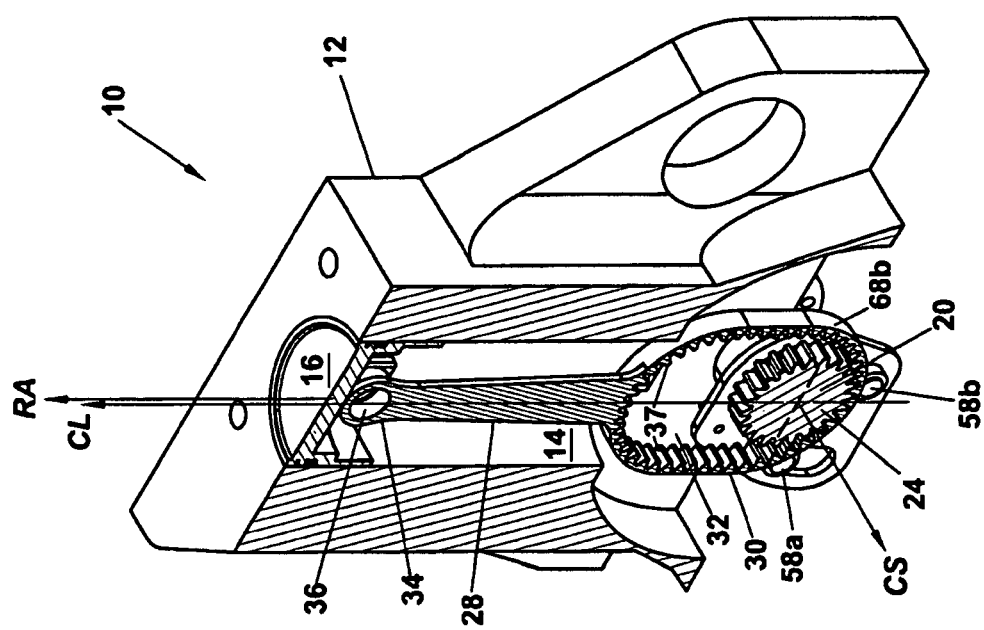
FIG. 6 is a schematic perspective section view take along line A-A of FIG. 5.

Referring to FIGS. 2A, 2B, and 6, in exemplary engine 10, pistons 16 are operably coupled to crankshaft 20 via a number of connecting rods 28 corresponding to the number of pistons 16. In particular, exemplary connecting rods 28 define a proximal portion 30 having a first end aperture 32 for receiving crankshaft 20. Connecting rods 28 further define a distal portion 34 having a second end aperture 36 for operably coupling connecting rod 28 to a respective piston 16 via, for example, a pin 38 (see, e.g., FIG. 7). Connecting rod 28 further defines a longitudinal axis CR extending between the center of first end aperture 32 and second end aperture 36.

As shown in, for example, FIGS. 2A, 2B, and 6, exemplary first end aperture 32 of exemplary connecting rod 28 includes an internal gear 37 configured to engage a corresponding gear 24 of crankshaft 20. In particular, teeth on internal gear 37 are configured to engage teeth on gear 24 of crankshaft 20, such that reciprocating motion of connecting rod 28 is transferred to crankshaft 20 via engagement of the teeth of internal gear 37 with the teeth of crankshaft gear 24, resulting in rotation of crankshaft 20. Thus, as used herein, the term "crankshaft" refers to a shaft that may be driven by a connecting rod, but does not necessarily refer to a shaft that includes one or more crankpins, as may be implied by conventional use of the term "crankshaft."

As shown in FIG. 2B, exemplary first end aperture 32 defines a distal curved portion 31a and a proximal curved portion 31b separated from one another along the longitudinal axis CR of connecting rod 28 and joined by opposing side portions 33a and 33b. Distal and proximal curved portions 31a and 31b define respective apexes 35a and 35b, which, in turn, define a distance S extending therebetween along connecting rod longitudinal axis CR. The shape of first end aperture 32 shown in FIGS. 2 and 6-15 is schematic and exemplary, and other shapes are contemplated. For example, the shape of first end aperture 32 may be tailored to achieve differing engine performance characteristics (e.g., efficiency, responsiveness, power, and/or torque characteristics), as explained in greater detail herein.

Exemplary engine 10 shown in FIGS. 1-15 may also include a retainer assembly 40 configured to maintain engagement between the teeth of crankshaft gear 24 and the teeth of internal gear 37, as internal gear 37 orbits about crankshaft gear 24. For example, the exemplary embodiment of retainer assembly 40 shown in FIG. 4 includes a pair of opposing plates 42a and 42b. Plates 42a and 42b include respective apertures 44a and 44b configured to receive crankshaft 20, and respective slots 46a and 46b. Exemplary retainer assembly 40 further includes arms 48a and 48b associated with respective plates 42a and 42b, such that they pivot about respective pins 50a and 50b. Proximal ends 52a and 52b of respective arms 48a and 48b are coupled to plates 42a and 42b via pins 50a and 50b, such that distal ends 54a and 54b pass over and along respective slots 46a and 46b of plates 42a and 42b.

On a first side of exemplary plates 42a and 42b opposite with respect to the sides of plates 42a and 42b on which arms 48a and 48b are located, respective first bearings 56a and 56b are provided at a location corresponding to pins 50a and 50b. Respective second bearings 58a and 58b are located on distal ends 54a and 54b of respective arms 48a and 48b, such that they extend through respective slots 46a and 46b and follow slots 46a and 46b as arms 48a and 48b pivot about pins 50a and 50b. Exemplary retainer assembly 40 further includes biasing assemblies 60a and 60b associated with respective plates 42a and 42b, including, for example, respective biasing members 62a and 62b (e.g., springs) extending between first anchors 64a and 64b coupled to plates 42a and 42b and second anchors 66a and 66b coupled to arms 48a and 48b. First and/or second anchors may be, for example, posts.

Figure 7:
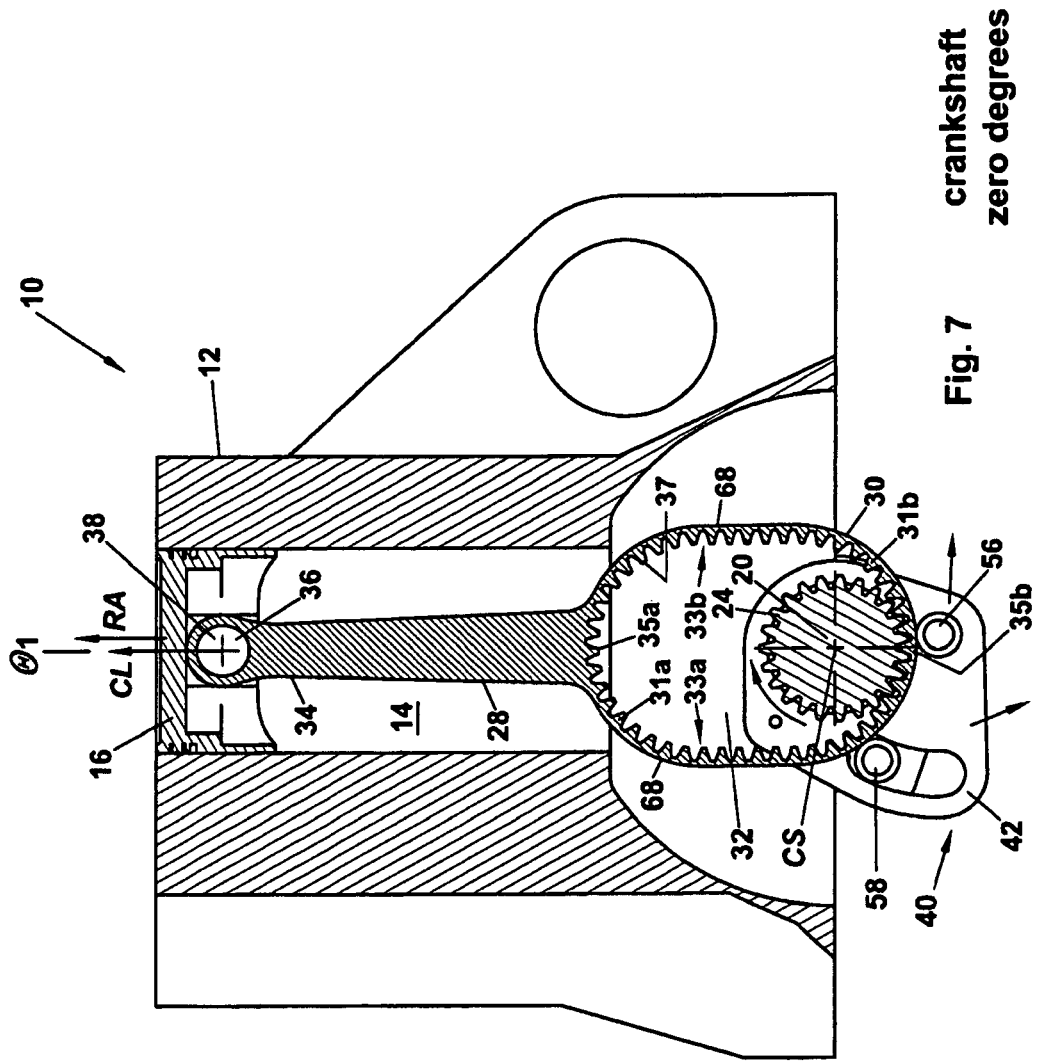
FIG. 7 is a schematic end section view of the exemplary embodiment shown in FIG. 1 with a radial axis angle of an exemplary crankshaft shown at 0 degrees.

As shown in, for example, FIGS. 2A, 6, and 7, apertures 44a and 44b of plates 42a and 42b receive crankshaft 20, such that a connecting rod 28 associated with retainer assembly 40 is sandwiched between plates 42a and 42b. Plates 42a and/or 42b may be held in a longitudinal position on crankshaft 20 via, for example, an annular groove (not shown) in crankshaft 20, via snap-rings (not shown), and/or via other structures known to those skilled in the art.

As shown in FIGS. 6 and 7, plates 42a and 42b are positioned on crankshaft 20, such that bearings 56a, 56b, 58a, and 58b ride on respective ridges 68a and 68b formed on connecting rod 28 (see, e.g., FIGS. 2A, 2B, 6, and 7), which extend around the periphery of first end aperture 32 of connecting rod 28. Thus, internal gear 37 of connecting rod 28 is retained between crankshaft gear 24 and bearings 56a, 56b, 58a, and 58b of retainer assembly 40. Exemplary biasing assemblies 60a and 60b permit bearings 58a and 58b to follow respective ridges 68a and 68b regardless of the shape of ridges 68a and 68b, which may follow a path that generally corresponds to the shape of internal gear 37. In particular, biasing members 62a and 62b provide tension on arms 48a and 48b, such that bearings 58a and 58b remain in contact with ridges 68a and 68b as plates 42a and 42b rotate about crankshaft 20 in a counterclockwise direction (as shown) (see FIGS. 7-15), with bearings 58a and 58b following bearings 56a and 56b. Internal gear 37 is retained between (i.e., sandwiched between) bearings 56a and 56b and crankshaft gear 24. In such an exemplary manner, exemplary retainer assembly 40 serves to retain engagement between the teeth of crankshaft gear 24 and the teeth of internal gear 37 of connecting rod 28. Although, the exemplary embodiment of retainer assembly 40 shown and described includes two plates 42a and 42b and associated parts, it is contemplated that retainer assembly 40 could include other numbers of plates and associated parts, such as, for example, a single plate 42 and associated parts, During operation of a conventional engine, a piston reciprocates within the cylinder between spaced stroke termination points defining the stroke of the piston, such that during a power stroke of the internal combustion engine, combustion of an air/fuel mixture within a combustion chamber defined by the piston and the cylinder (and cylinder-head (not shown)) forces the piston toward the crankshaft. As the piston travels toward the crankshaft, the crankshaft is rotated via the connecting rod and a crankpin, thereby converting the potential energy associated with the air/fuel mixture into mechanical work.

Due to the architecture of a conventional internal combustion engine, however, when the piston is at a position within the cylinder that coincides with the maximum compression (e.g., the combustion chamber is at its lowest volume, this condition coinciding with maximum compression when the piston is farthest from the crankshaft), the axis of the connecting rod and the axis of the crankpin tend to be nearly co-linear, if not co-linear. At these relative positions, as the piston first begins its movement toward the crankshaft during the power stroke, there is only a very short moment arm (if any) extending between the axis of the connecting rod and the axis of the crankshaft. As a result, the force initially created by the air/fuel mixture at the moment of combustion does not transfer as much torque to the crankshaft as it would if the length of the moment arm, were greater. This situation may be particularly undesirable because, during combustion and very shortly thereafter, the force on the piston due to the combustion event approaches its maximum magnitude. Further, as the piston travels down the cylinder toward the crankshaft and the length of the moment arm increases, the magnitude of the force from the combustion event acting on the piston dissipates rapidly. Thus, because there is a very short moment arm created between the axis of the connecting rod and the axis of the crankshaft during the time of maximum force on the piston, efficiency of the work generated from the combustion process in a conventional internal combustion engine may be less than desired.

In contrast to a conventional engine, exemplary engine 10 shown in FIGS. 1-15 is configured to employ a strategy that delays any substantial movement of piston 16 toward crankshaft 20 during the power stroke, until crankshaft 20 has rotated to point at which there is a more effective moment arm between connecting rod axis CR and crankshaft axis CS. More specifically, internal gear 37 is configured such that as crankshaft 20 rotates past a stroke termination angle that may coincide with a stroke termination point of piston 16's travel, reversal of direction of the travel of piston 16 within cylinder 14 is delayed until a larger moment arm exists between connecting rod 28 and crankshaft axis CS.

For example, if piston 16 would have normally reversed its direction of travel where radial axis RA of crankshaft 20 is at 0 degrees, piston 16 may (1) reach its stroke termination point with radial axis RA at zero degrees and then delay its reversal of direction until a larger moment arm exists between connecting rod 28 and crankshaft axis CS, or (2) continue to move in cylinder 14 in a direction away from crankshaft 20, even after radial axis RA has reached 0 degrees and delay its reversal of direction until a larger moment arm exists between connecting rod 28 and crankshaft axis CS. As a result, a greater amount of the energy of the combustion event may be captured because the maximum force acting on piston 16 coincides with a greater moment arm, thereby resulting in more torque at crankshaft 20 during the power stroke. (See Table I below showing an exemplary relationship for exemplary engine 10 shown in FIGS. 1-15 between radial axis RA's angle and piston 16's displacement relative to zero degrees past first stroke termination angle $\theta_1$.)

TABLE I

RADIAL AXIS RA ANGLE VS. PISTON DISPLACEMENT RELATIVE TO ZERO DEGREES FOR EXEMPLARY ENGINE SHOWN IN FIGS. 1-15

| Crank Angle | Piston Depth |
|---|---|
| 0 | 0.000 |
| 4 | 0.003 |
| 8 | 0.001 |
| 12 | 0.011 |
| 16 | 0.027 |
| 20 | 0.053 |
| 24 | 0.084 |
| 28 | 0.121 |
| 32 | 0.164 |
| 36 | 0.216 |
| 40 | 0.267 |
| 44 | 0.327 |
| 48 | 0.394 |
| 52 | 0.462 |
| 56 | 0.537 |
| 60 | 0.615 |
| 64 | 0.690 |
| 68 | 0.765 |
| 72 | 0.839 |
| 76 | 0.914 |
| 80 | 0.989 |
| 84 | 1.064 |
| 88 | 1.139 |
| 92 | 1.213 |
| 96 | 1.288 |
| 100 | 1.363 |
| 104 | 1.438 |
| 108 | 1.513 |
| 112 | 1.587 |
| 116 | 1.662 |
| 120 | 1.737 |
| 124 | 1.812 |
| 128 | 1.886 |
| 132 | 1.961 |
| 136 | 2.036 |
| 140 | 2.110 |
| 144 | 2.196 |
| 148 | 2.277 |
| 152 | 2.360 |
| 156 | 2.442 |
| 160 | 2.519 |
| 164 | 2.594 |
| 168 | 2.668 |
| 172 | 2.723 |
| 176 | 2.782 |
| 180 | 2.831 |

As shown in FIGS. 7-15, during operation of exemplary engine 10, as crankshaft 20 rotates, a radial axis RA of crankshaft 20 revolves in a plane perpendicular to longitudinal axis CS of crankshaft 20. Thus, first end aperture 32 of connecting rod 28, which engages crankshaft 20 via internal gear 37 and corresponding crankshaft gear 24, orbits about crankshaft axis CS. Second end aperture 36 of connecting rod 28 is constrained to move in a linear, reciprocating manner due to being operably coupled to piston 16, which is likewise constrained to move in a linear, reciprocating manner between spaced stroke termination points defining a stroke of the piston along cylinder axis CL within respective cylinders 14 defined by cylinder block 12. As a result, as crankshaft 20 rotates, piston 16 reciprocates within cylinder 14, defining a piston stroke generally corresponding to the distance S (see FIG. 2B) between apex 35a of distal curved portion 31a and apex 35b of proximal curved portion 31b of internal gear 37.

As shown in FIG. 7, crankshaft 20 is oriented such that radial axis RA defined by the center of crankshaft 20 and the longitudinal axis CL of cylinder 14 is oriented at 0 degrees, which may correspond generally to a first stroke termination angle $\theta_1$. According to some embodiments, first stroke termination angle $\theta_1$ may generally coincide with a first stroke termination point of piston 16's travel, corresponding to the end of the compression stroke (and/or exhaust stroke) and/or the beginning of the power stroke (and/or the intake stroke). According to some embodiments, engine 10 may be configured such that piston 16 continues to travel in cylinder 14 in a direction away from crankshaft 20, even as radial axis RA passes first stroke termination angle $\theta_1$, such that reversal of direction of piston 16 in cylinder 14 is delayed.

Figure 8:
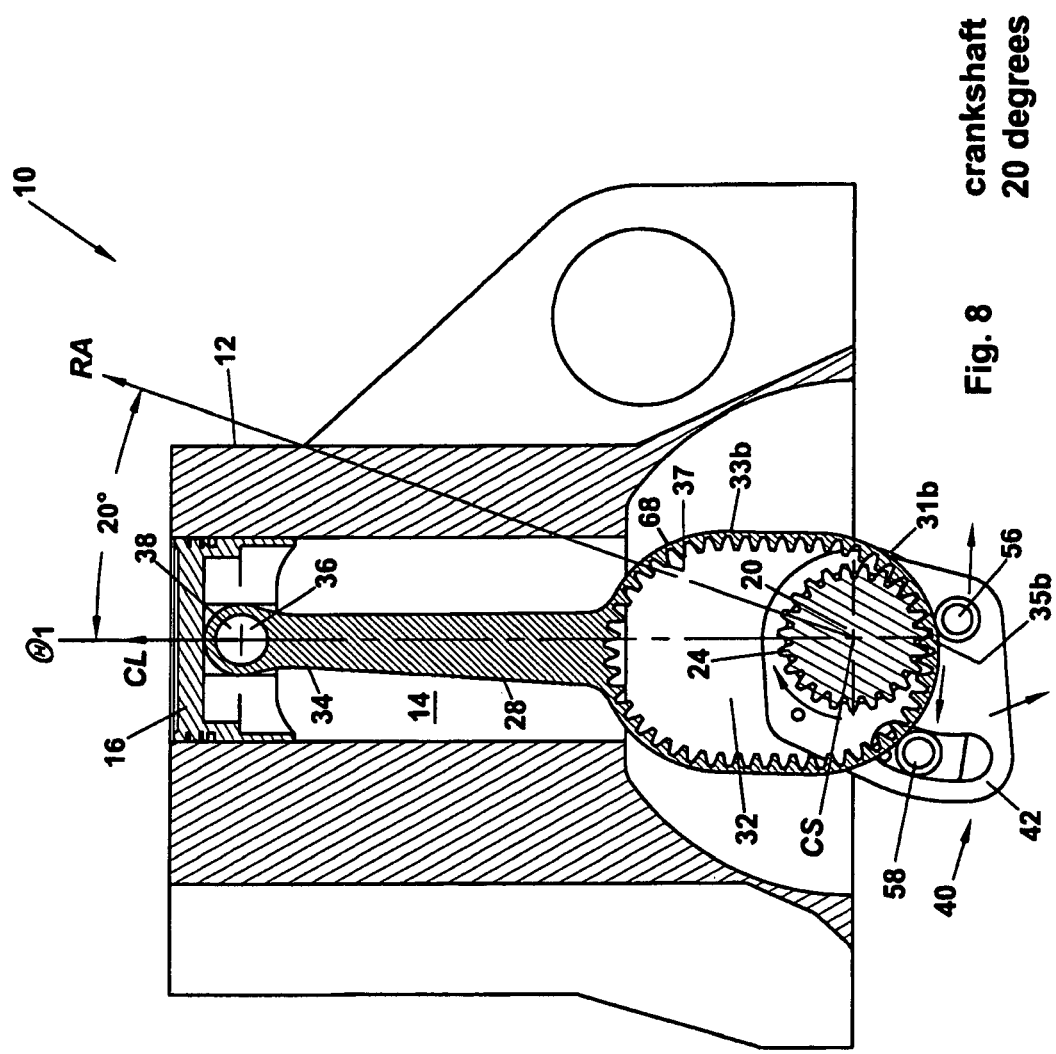
FIG. 8 is a schematic end section view of the exemplary embodiment shown in FIG. 1 with the radial axis angle of the exemplary crankshaft shown at 20 degrees.

As can be seen, for example, in FIGS. 7 and 8, as crankshaft 20 rotates (clockwise as shown), crankshaft gear 24 drives apex 35b of proximal curved portion 31b toward the left (see FIG. 8). Because apex 35b of connecting rod 28 moves left rather than downward, piston 16 remains at a position approaching the end of the compression stroke, even though crankshaft 20 has continued to rotate to point at which radial axis RA has reached 20 degrees past first stroke termination angle $\theta_1$. Thus, downward travel of piston 16 has been delayed following piston 16 reaching the stroke termination point. With respect to exemplary retainer assembly 40, as crankshaft gear 24 rotates clockwise between a radial angle RA of zero degrees and 20 degrees past first stroke termination angle $\theta_1$, plate 42 of retainer assembly 40 rotates (counterclockwise as shown) about crankshaft 20 and maintains the engagement between the teeth of crankshaft gear 24 and the teeth of internal gear 37.

Figure 9:
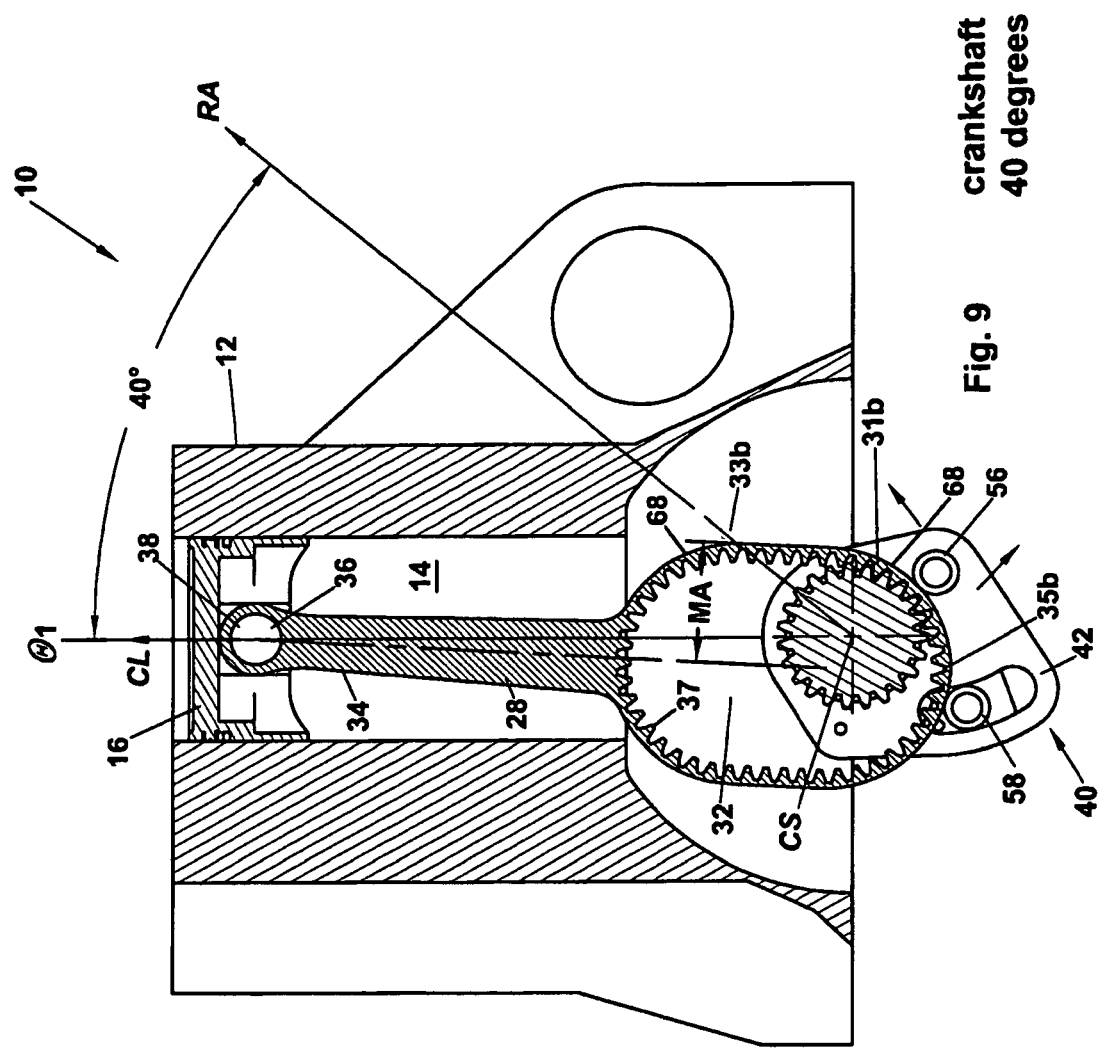
FIG. 9 is a schematic end section view of the exemplary embodiment shown in FIG. 1 with the radial axis angle of the exemplary crankshaft shown at 40 degrees.

Referring to FIG. 9, as radial axis RA approaches 40 degrees past first stroke termination angle $\theta_1$, piston 16 begins to travel down cylinder 14 toward crankshaft 20. Meanwhile, internal gear 37 has continued to move to the left, such that crankshaft gear 24 engages the teeth of internal gear 37 at a point of transition between proximal curved portion 31b and side portion 33b. Thus, as piston 16 begins to travel down cylinder 14, a moment arm MA (see also FIG. 2B) defined by the distance between the center C of crankshaft 20 and the teeth of internal gear 37, has been created. As a result, as combustion begins and drives piston 16 down cylinder 14, relatively more torque can be generated on crankshaft 20 due to moment arm MA being longer relative to a conventional engine, which generally has no moment arm, or only an extremely small moment arm, at the time of the beginning of combustion. Plate 42 of retainer assembly 40 continues to rotate counterclockwise about crankshaft 20 and maintains the engagement between the teeth of crankshaft gear 24 and the teeth of internal gear 37.

Figure 10:
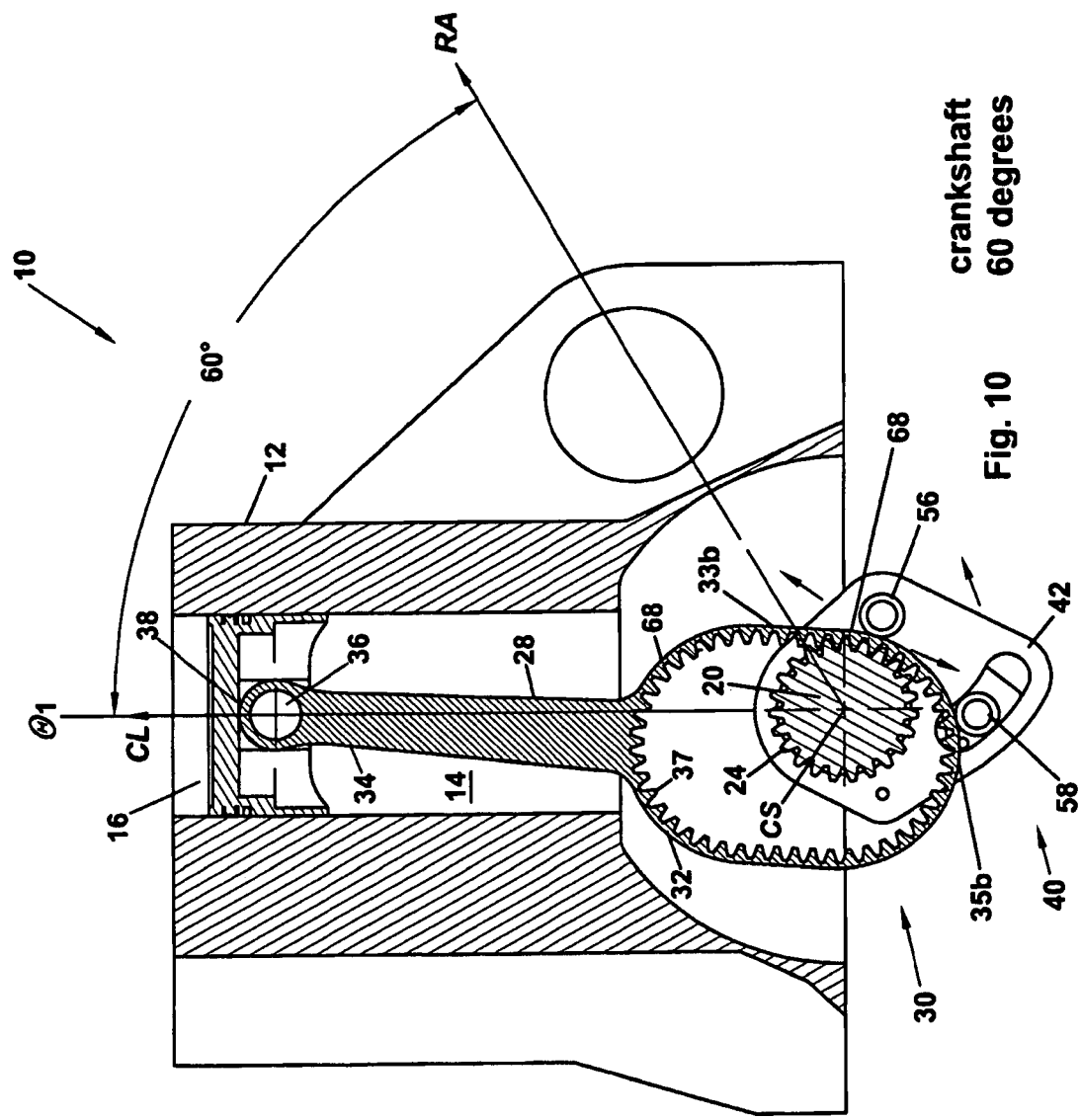
FIG. 10 is a schematic end section view of the exemplary embodiment shown in FIG. 1 with the radial axis angle of the exemplary crankshaft shown at 60 degrees.

Referring to FIG. 10, radial axis RA has moved 60 degrees past first stroke termination angle $\theta_1$, and piston 16 continues to travel down cylinder 14 toward crankshaft 20 as the combustion process continues. Crankshaft gear 24 engages internal gear 37 of connecting rod 28 at side portion 33b. At this position of radial axis RA, connecting rod 28 begins to move almost exclusively downward, with very little additional movement toward the left. Plate 42 of retainer assembly 40 continues to rotate counterclockwise about crankshaft 20 and maintains the engagement between the teeth of crankshaft gear 24 and the teeth of internal gear 37.

Figure 11:
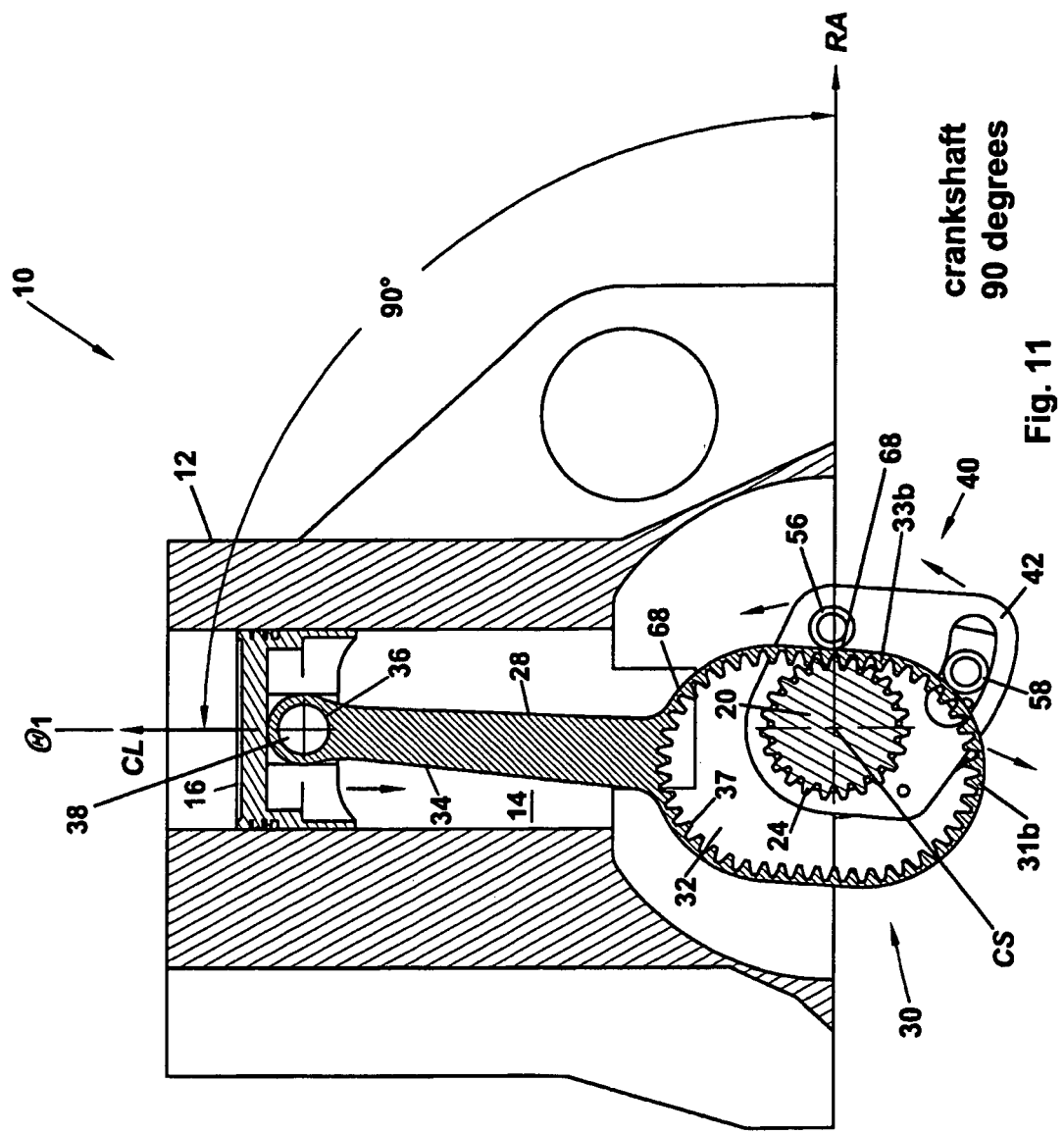
FIG. 11 is a schematic end section view of the exemplary embodiment shown in FIG. 1 with the radial axis angle of the exemplary crankshaft shown at 90 degrees.

As shown in FIG. 11, radial axis RA has moved 90 degrees past first stroke termination angle $\theta_1$, and piston 16 continues to travel down cylinder 14 toward crankshaft 20 as the combustion process continues. Crankshaft gear 24 continues to engage internal gear 37 of connecting rod 28 at side portion 33b. At this position of radial axis RA, connecting rod 28 continues to move almost exclusively downward, with very little additional movement toward the left. Plate 42 of retainer assembly 40 continues to rotate counterclockwise about crankshaft 20 and maintains the engagement between the teeth of crankshaft gear 24 and the teeth of internal gear 37.

Figure 12:
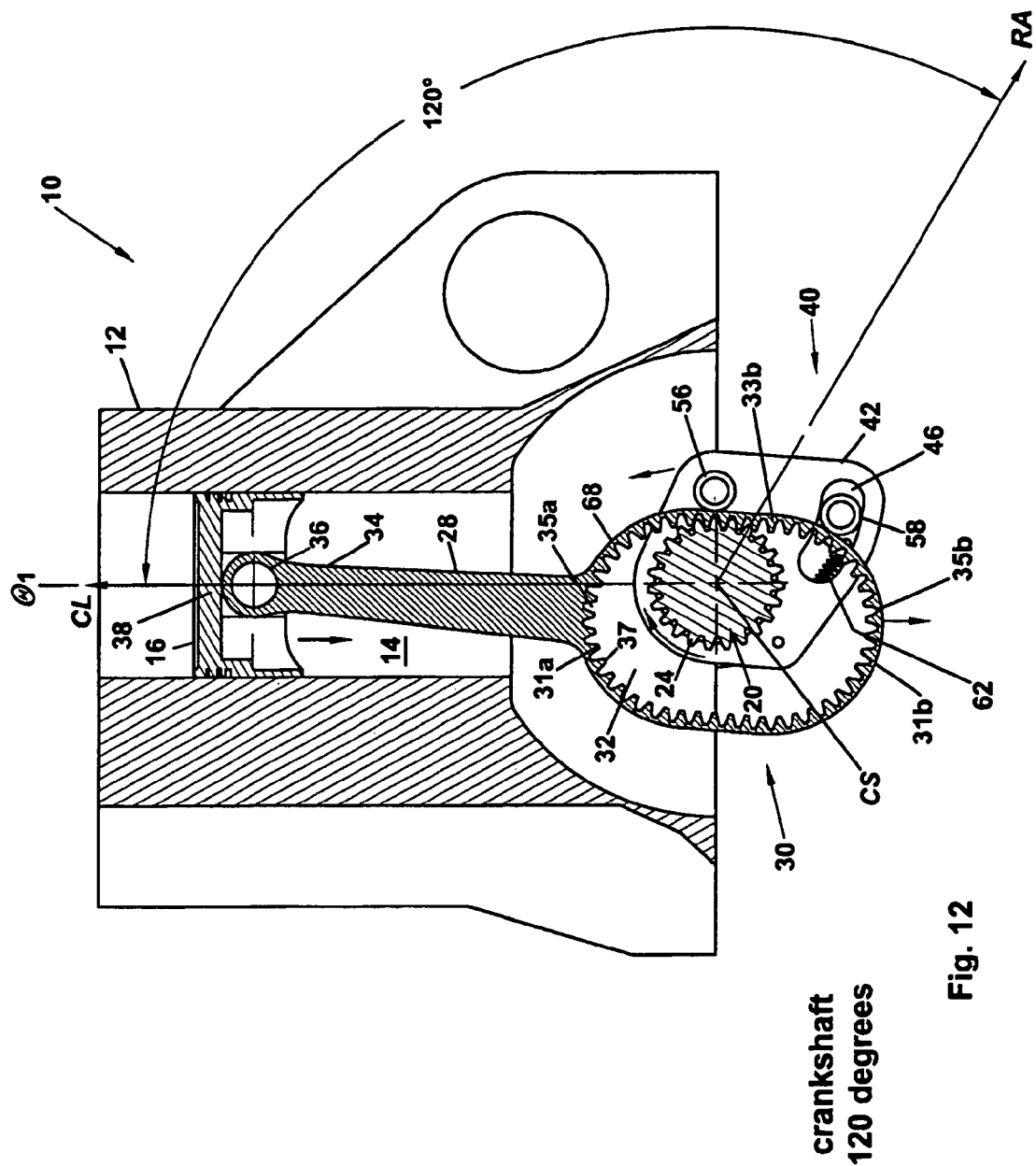
FIG. 12 is a schematic end section view of the exemplary embodiment shown in FIG. 1 with the radial axis angle of the exemplary crankshaft shown at 120 degrees.

As shown in FIG. 12, radial axis RA has moved 120 degrees past first stroke termination angle $\theta_1$, and piston 16 continues to travel down cylinder 14 toward crankshaft 20 as the combustion process continues. Crankshaft gear 24 continues to engage internal gear 37 of connecting rod 28 at side portion 33b. At this position of radial axis RA, connecting rod 28 continues to move almost exclusively downward, with very little additional movement toward the left. Plate 42 of retainer assembly 40 continues to rotate counterclockwise about crankshaft 20 and maintains the engagement between the teeth of crankshaft gear 24 and the teeth of internal gear 37. Further, biasing member 62 (e.g., a spring) stretches such that arm 48 pivots and permits bearing 58 to move in slot 46 to a point farther away from the center of aperture 44 of plate 42 as ridge 68 of connecting rod 28 becomes farther away at the point of contact of bearing 58.

Figure 13:
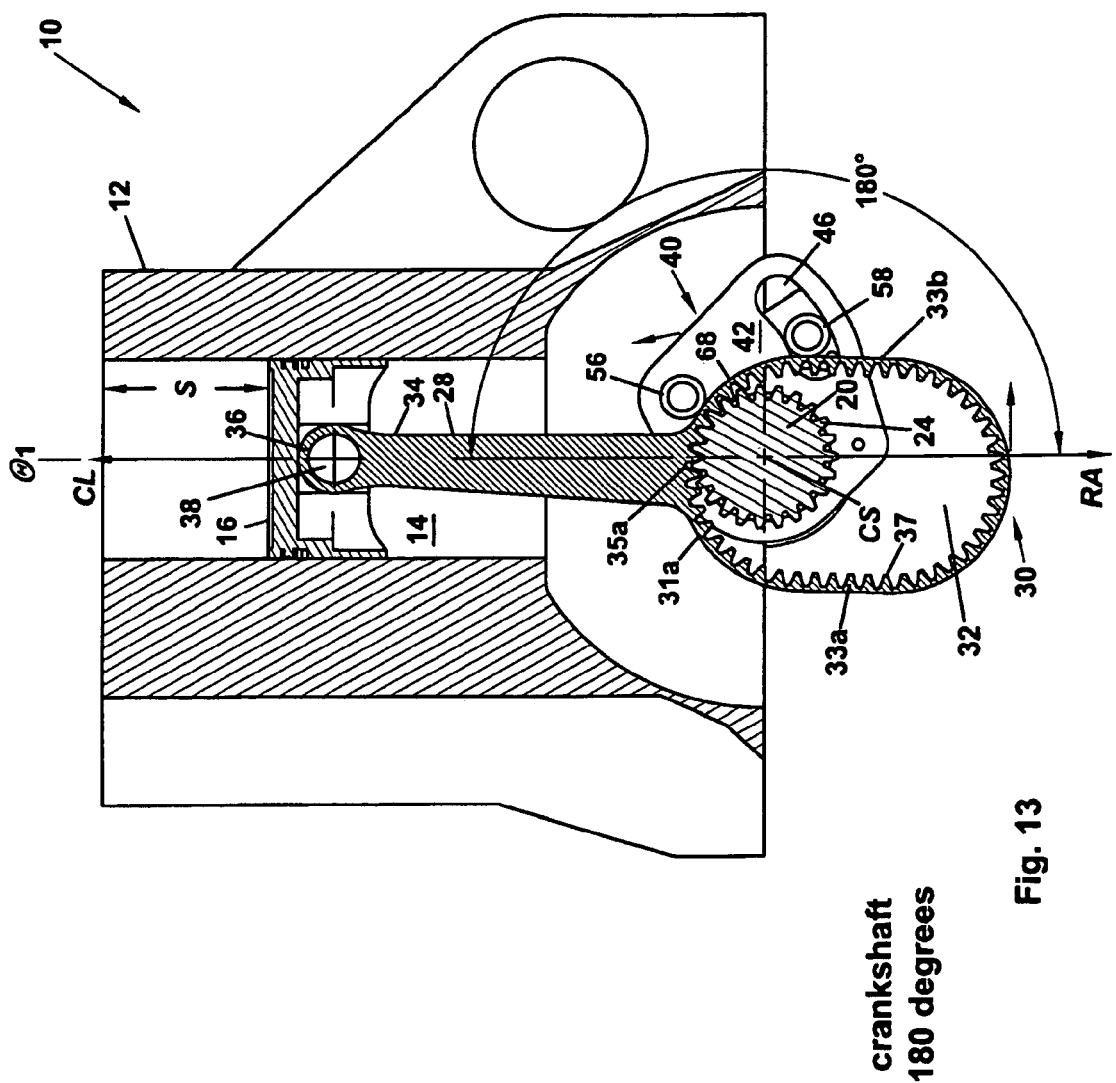
FIG. 13 is a schematic end section view of the exemplary embodiment shown in FIG. 1 with the radial axis angle of the exemplary crankshaft shown at 180 degrees.

As radial axis RA moves to 180 degrees past first stroke termination angle $\theta_1$, (i.e., a radial angle RA approaching the end of the power stroke and/or intake stroke, which coincides with a second stroke termination angle $\theta_2$), as shown in FIG. 13, piston 16 ends its travel down cylinder 14 toward crankshaft 20 at a second stroke termination point of piston 16's travel. Crankshaft gear 24 transitions from engaging side portion 33b of internal gear 37 to engaging distal curved portion 31a at a point approaching its apex 35a. At this position of radial axis RA, proximal portion 30 of connecting rod 28 moves to the right (as shown) relative to crankshaft 20 and reaches the end of its downward stroke S. Plate 42 of retainer assembly 40 continues to rotate counterclockwise about crankshaft 20 and maintains the engagement between the teeth of crankshaft gear 24 and the teeth of internal gear 37. Further, as ridge 68 of connecting rod 28 returns to a position closer to the center of aperture 44 of plate 42, biasing member 62 returns arm 48 to a position, such that bearing 58 returns to a position in slot 46 that maintains contact between bearing 58 and ridge 68 of connecting rod 28.

Figure 14:
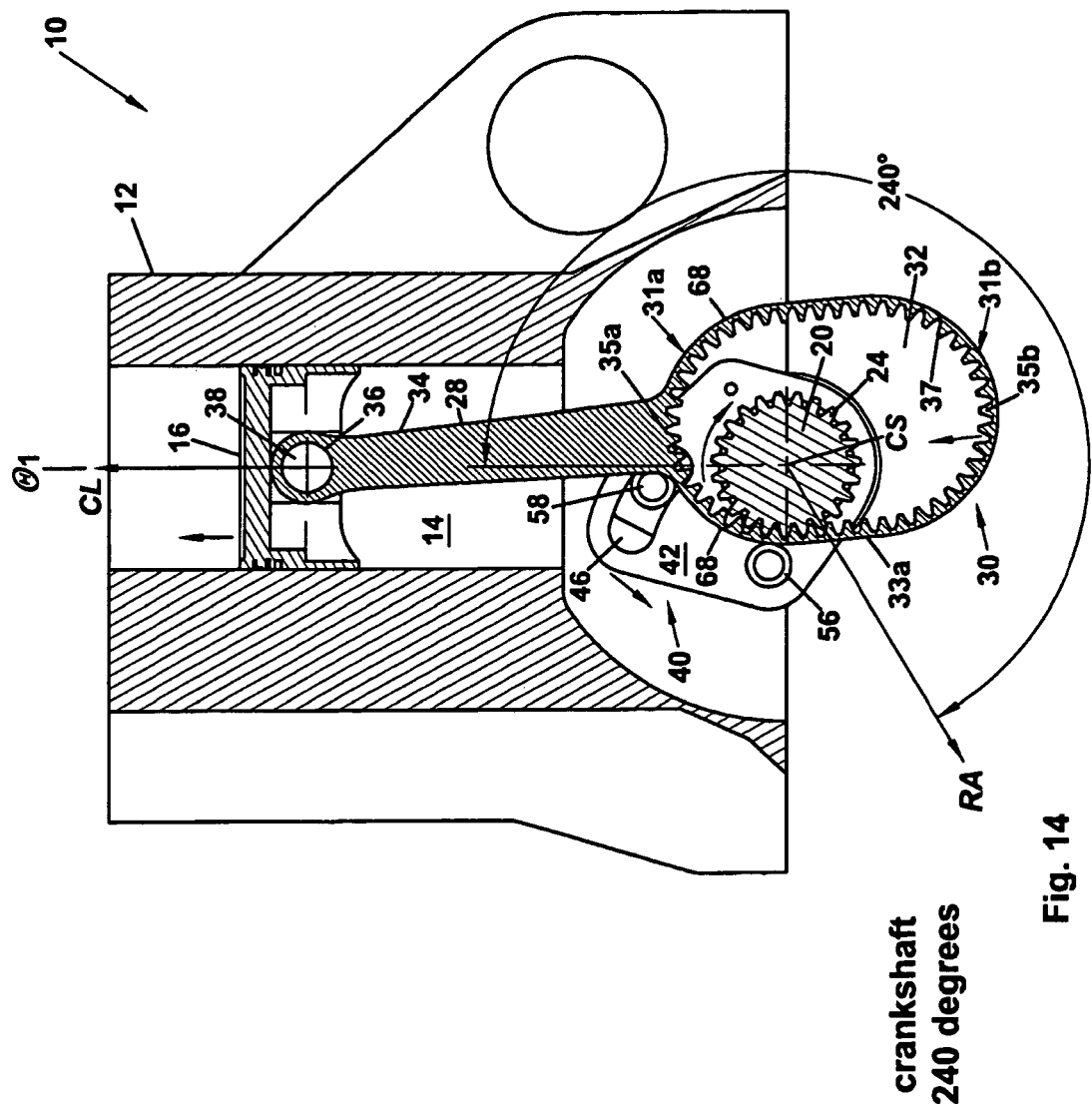
FIG. 14 is a schematic end section view of the exemplary embodiment shown in FIG. 1 with the radial axis angle of the exemplary crankshaft shown at 240 degrees.

As shown in FIG. 14, as radial axis RA moves from 180 degrees to 240 degrees past first stroke termination angle $\theta_1$, piston 16 reverses direction in cylinder 14 and travels up cylinder 14 in a direction away from crankshaft 20. Crankshaft gear 24 transitions from engaging distal curved portion 31a to engaging side portion 33a. At this position of radial axis RA, proximal portion 30 of connecting rod 28 begins move to the left, and connecting rod 28 moves upward, further into cylinder 14. Plate 42 of retainer assembly 40 continues to rotate counterclockwise about crankshaft 20, as shown, and maintains the engagement between the teeth of crankshaft gear 24 and the teeth of internal gear 37.

Figure 15:
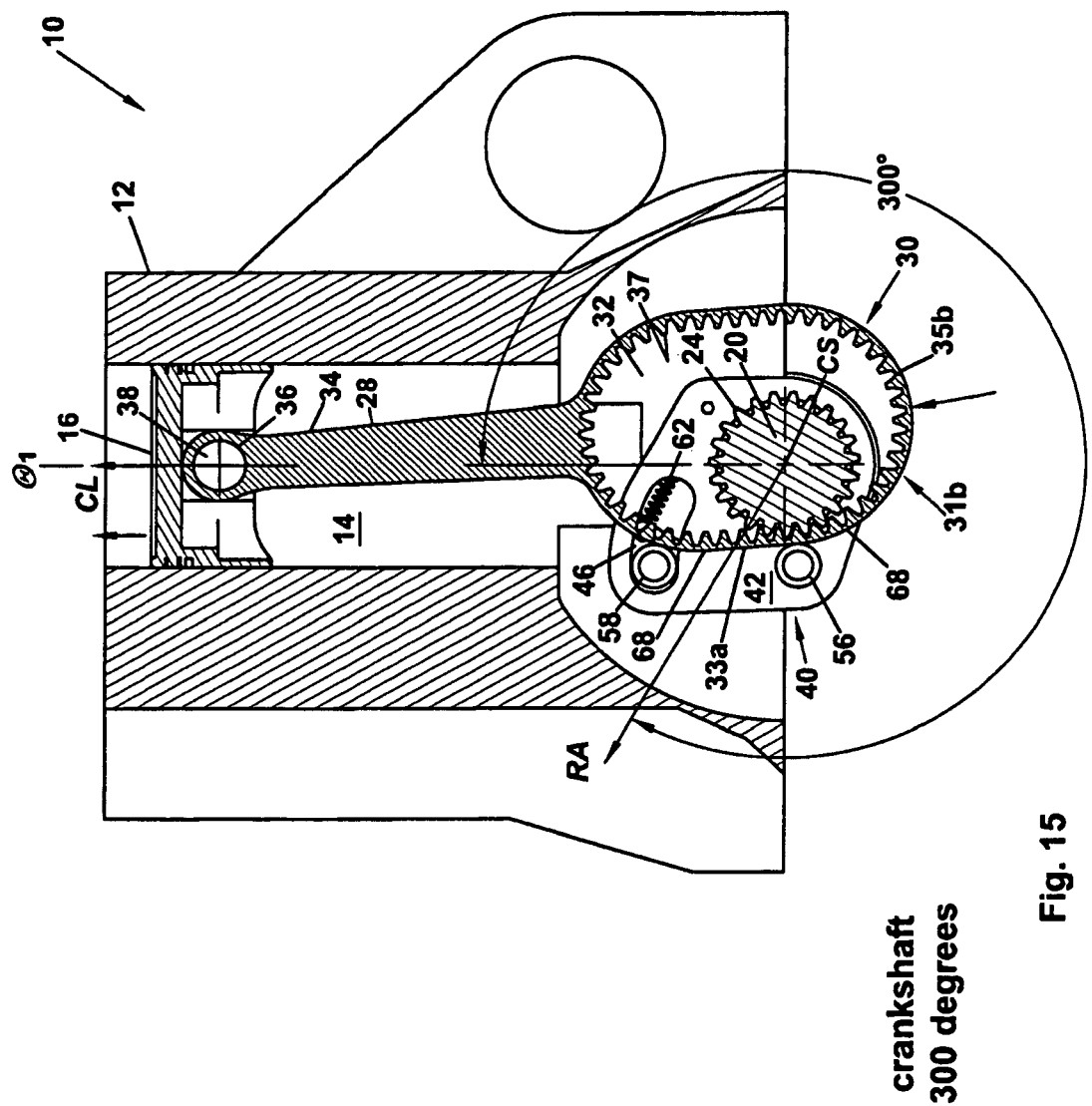
FIG. 15 is a schematic end section view of the exemplary embodiment shown in FIG. 1 with the radial axis angle of the exemplary crankshaft shown at 300 degrees.

As shown in FIG. 15, as radial axis RA moves from 240 degrees to 300 degrees past first stroke termination angle $\theta_1$, piston 16 continues to travel up cylinder 14 in a direction away from crankshaft 20. Crankshaft gear 24 begins to transition from engaging side portion 33a to engaging proximal curved portion 31b. At this position of radial axis RA, proximal portion 30 of connecting rod 28 begins to move back to the left and continues upward in a direction away from crankshaft 20. Plate 42 of retainer assembly 40 continues to rotate counterclockwise about crankshaft 20, as shown, and maintains the engagement between the teeth of crankshaft gear 24 and the teeth of internal gear 37.

Returning to FIG. 7, as radial axis RA continues to rotate in the clockwise direction, it approaches 360 degrees past first stroke termination angle $\theta_1$, or in other words, it returns to first stroke termination angle $\theta_1$. At this position of radial axis RA, piston 16 ends its travel in cylinder 14 away from crankshaft 20 and remains substantially stationary as internal gear 37 moves to the left, such that crankshaft gear 24 engages internal gear 37 at apex 35*b*. Plate 42 of retainer assembly 40 continues to rotate counterclockwise about crankshaft 20, as shown, and maintains the engagement between the teeth of crankshaft gear 24 and the teeth of internal gear 37.

According to the exemplary embodiment shown in FIGS. 1-15, the cross-sectional shape of internal gear 37 affects the travel of piston 16 within cylinder 14, and thus, the cross-sectional shape of internal gear 37 may be tailored to change performance characteristics of exemplary engine 10. For example, one or more of curved portions 31*a* and 31*b* and side portions 33*a* and 33*b* of internal gear 37 may be shaped to have a profile that affects performance of exemplary engine 10 in a desired manner. For example, by increasing the length and/or flatness of curved portions 31*a* and/or 31*b*, the delay of piston 16's travel within cylinder 14 at the end of piston 16's stroke may be increased. Further, changing the shape of curved portions 31*a* and 31*b* may alter the relative acceleration of piston 16 within cylinder 14. Further, one or more of side portions 33*a* and 33*b* may be straightened or curved to a lesser or greater extent based on the desired travel characteristic of piston 16 within cylinder 14.

According to the exemplary embodiment shown in FIGS. 1-15, the size of crankshaft gear 24 may be altered to affect performance characteristics of exemplary engine 10. For example, by increasing the size of crankshaft gear 24 (i.e., increasing the radial pitch of the gear), a greater moment arm MA may be created between crankshaft 20 and connecting rod 28.

According to some embodiments, initiation of the power stroke of exemplary engine 10 may be delayed until crankshaft 20 has rotated at least about 10 degrees beyond the first stroke termination angle $\theta_1$ of the compression stroke. In other embodiments, initiation of the power stroke may be delayed until crankshaft 20 has rotated at least about 20 degrees beyond the first stroke termination angle $\theta_1$ of the compression stroke (e.g., at least about 25 degrees beyond the first stroke termination angle $\theta_1$). In other embodiments, rotation may be set to about 30, 35, or 40 degrees (see, e.g., FIG. 13) beyond the first stroke termination angle $\theta_1$ of the compression stroke.

Exemplary engine 10, may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

FIGS. 16-34B schematically illustrate a second exemplary embodiment of engine 10. The exemplary embodiment shown in FIGS. 16-34B includes features similar to the exemplary engine 10 shown in FIGS. 1-15. Unlike the exemplary engine 10 shown in FIGS. 1-15, however, exemplary engine 10 shown in FIGS. 16-34B includes two crankshafts 20*a* and 20*b*, and the gear 37 of connecting rod 28 may not be an internal gear.

Figure 16:
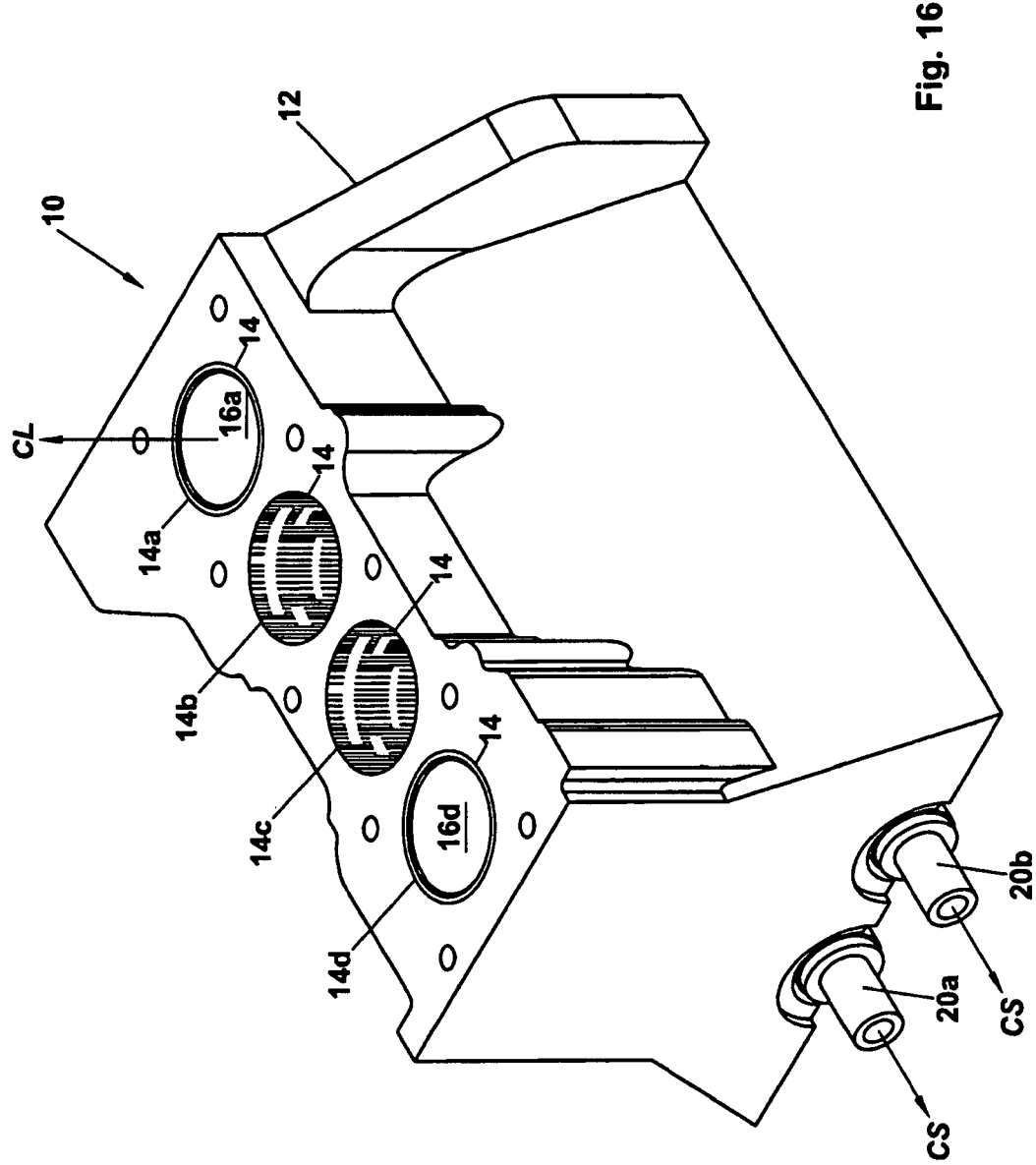
FIG. 16 is a schematic partial perspective view of another exemplary embodiment of an internal combustion engine.

As shown in FIG. 16, engine 10 includes a cylinder block 12 defining a number of cylinders 14, each defining a longitudinal axis CL. Although some of FIGS. 17-34B show a single cylinder 14 and associated exemplary parts, in those figures a single cylinder has been depicted in order to promote clarity, and those skilled in the art would understand that the principles depicted in those figures could be incorporated into a multi-cylinder engine.

In the exemplary embodiment shown in FIG. 16, engine 10 has an in-line configuration and four cylinders 14*a*, 14*b*, 14*c*, and 14*d*. Although exemplary engine 10 has a configuration commonly referred to as an "in-line four" configuration, engine 10 may have other configurations known to those skilled in the art, such as, for example, configurations commonly referred to as "V," "W," "H," "flat," "horizontally-opposed," and "radial." Further, although exemplary engine 10 has four cylinders, engine 10 may have other numbers of cylinders known to those skilled in the art, such as, for example, one, two, three, five, six, eight, ten, twelve, sixteen, twenty, and twenty-four. Thus, engine 10 may have, for example, any one of configurations commonly referred to as "flat-four," "flat-six," "in-line six," "straight-eight," "V-8," "V-10," "V-12," "W-12," and "H-16." Further, although exemplary engine 10 is described herein in relation to four-stroke operation, other operations known to those skilled in the art are contemplated, such as, for example, two-stroke, three-stroke, five-stroke, and six-stroke operation.

As shown in FIG. 16, exemplary engine 10 includes pistons 16 corresponding to cylinders 14, for example, four pistons 16*a*, 16*b*, 16*c*, and 16*d* (pistons 16*b* and 16*c* not shown). As shown in FIG. 16, pistons 16*a* and 16*d* are positioned in the upper end (i.e., "upper" being relative to the orientation of engine 10 shown in FIG. 16) of cylinders 14*a* and 14*d*, respectively, while pistons 16*b* and 16*c* are not visible in FIG. 16 due to being positioned lower in the cylinders 14*b* and 14*c*, respectively. To the extent that the relative positions of the pistons 16 in cylinders 14 tend to indicate a relative firing order of engine 10 (i.e., the sequential order of combustion events as identified by cylinders), exemplary engine 10 may be configured to have a different firing order, as is known to those skilled in the art.

Figure 17:
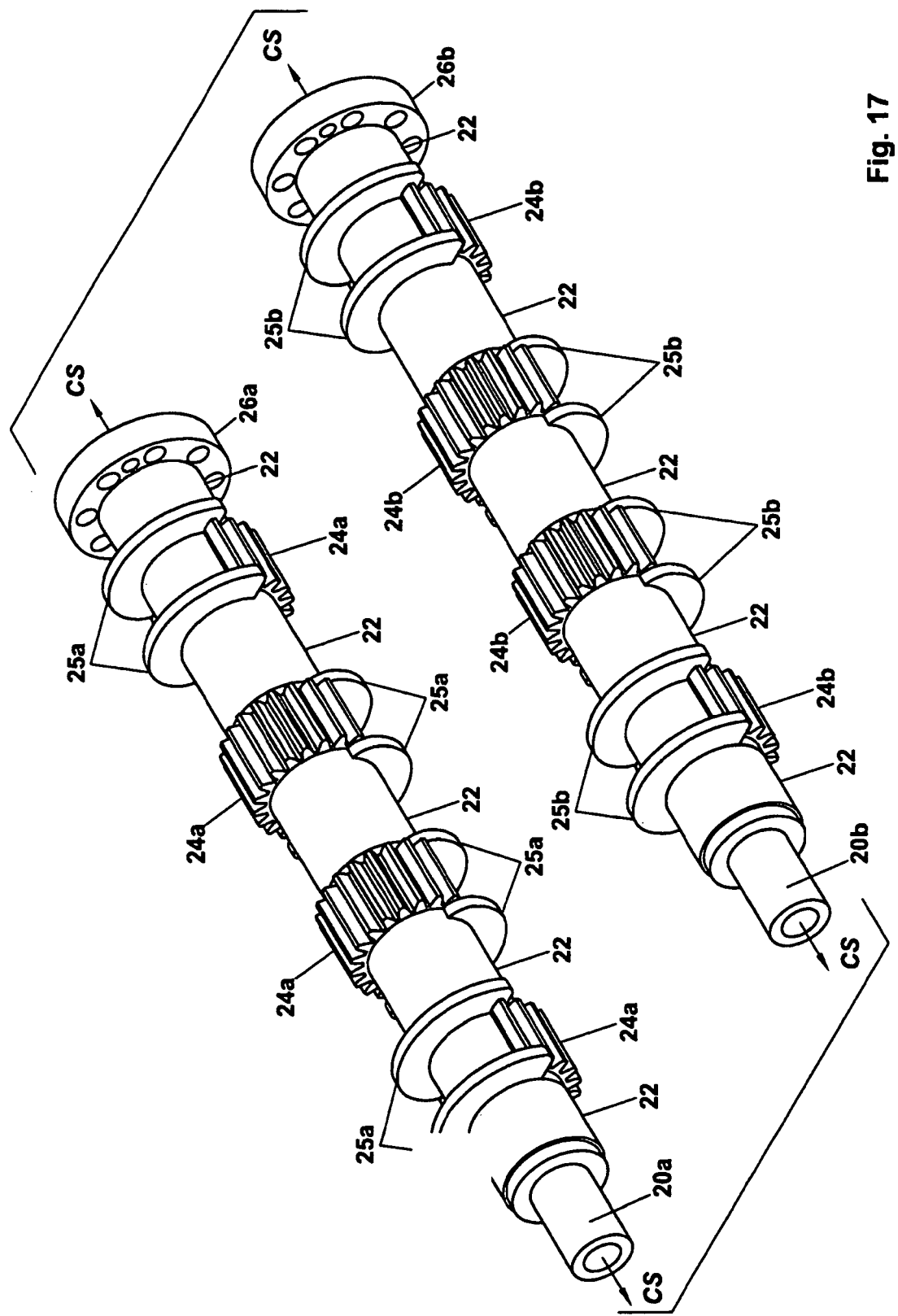
FIG. 17 is a schematic side view of exemplary embodiments of two crankshafts for the exemplary engine shown in FIG. 16.
Figure 21:
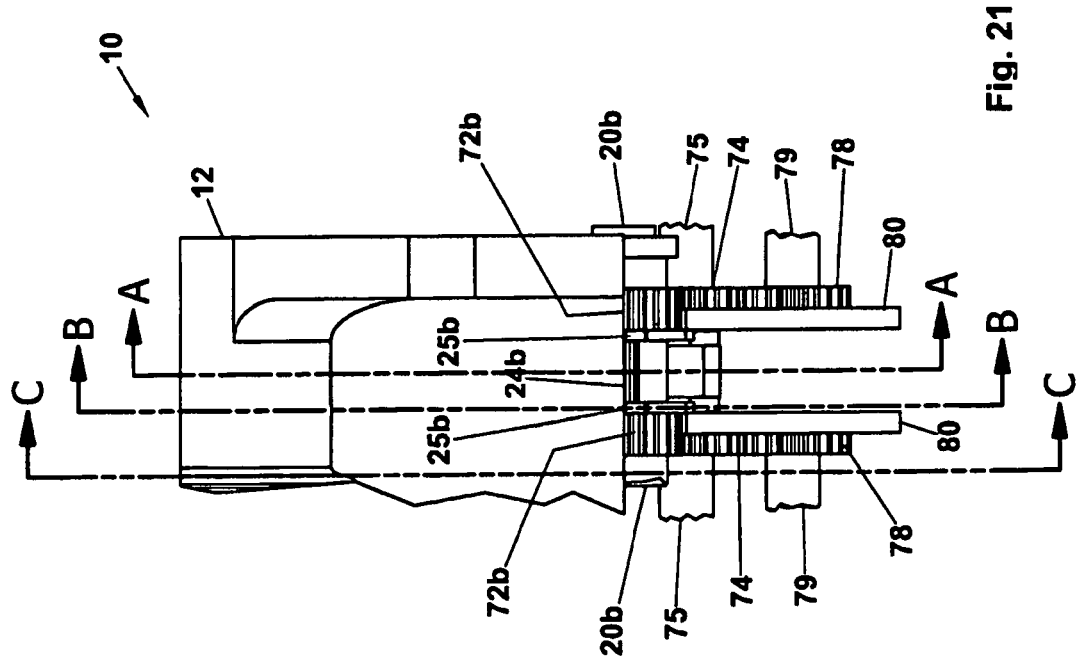
FIG. 21 is a schematic side view of a portion of the exemplary embodiment shown in FIG. 16.

Cylinder block 12 of exemplary engine 10 defines a number of bearings (not shown) for receiving two crankshafts 20*a* and 20*b*, such that crankshafts 20*a* and 20*b* may rotate relative to cylinder block 12 along respective longitudinal axes CS defined by crankshafts 20*a* and 20*b*. For example, as shown in FIGS. 17 and 21, crankshafts 20*a* and 20*b* are elongated members that define a number of journals 22 corresponding to a number of bearings (not shown) defined by cylinder block 12, and journals 22 are received by bearings, such that crankshafts 20*a* and 20*b* may rotate along respective longitudinal axes CS. Exemplary crankshafts 20*a* and 20b further include a number of respective gears 24a and 24b corresponding to the number of cylinders 14, for example, four of each of gears 24a and 24b corresponding, respectively, to cylinders 14a, 14b, 14c, and 14d (FIG. 16). According to the exemplary embodiment shown, at least some of the crankshaft gears 24a and 24b may be partial gears (i.e., they extend only partially around the crankshafts 20a and/or 20b). In addition, crankshafts 20a and 20b may further include flanges 26 configured to operably couple exemplary engine 10 a power train (not shown), either directly or via, for example, an intermediary gear train, chain drive, and/or belt drive.

Exemplary crankshafts 20a and 20b further include pairs of cams 25a and 25b associated with respective crankshaft gears 24a and 24b. For example, as shown in FIG. 17, crankshaft gears 24a and 24b may extend around a part of respective crankshafts 20a and 20b, and cams 25a and 25b may extend around only the part of respective crankshafts 20a and 20b where the crankshaft gears 24a and 24b do not extend (e.g., with some slight overlap). Further, the exemplary crankshafts 20a and 20b shown in FIG. 17 include longitudinally-spaced pairs of crankshaft gears 24a/24b and cams 25a/25b that are radially offset with respect to other gear/cam pairs.

Figure 18:
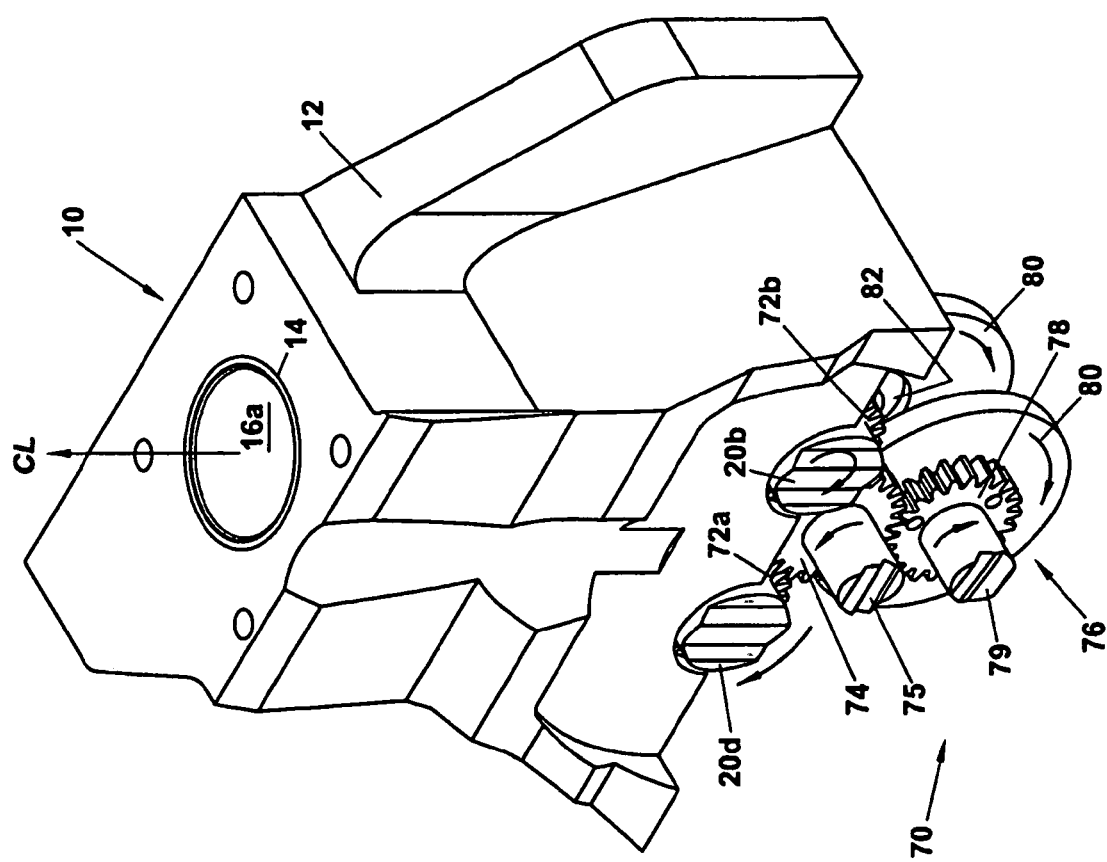
FIG. 18 is a schematic partial perspective view of a portion of the exemplary embodiment shown in FIG. 16.
Figure 19B:
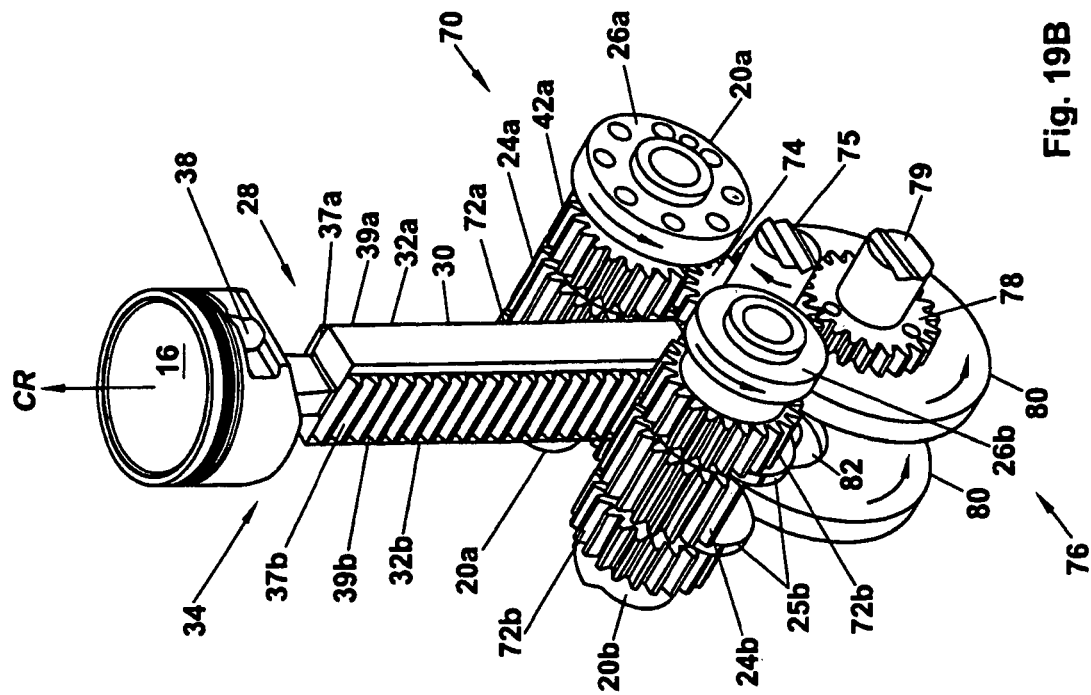
FIG. 19B is a schematic partial perspective view from a second perspective of a portion of the exemplary embodiment shown in FIG. 16.
Figure 19A:
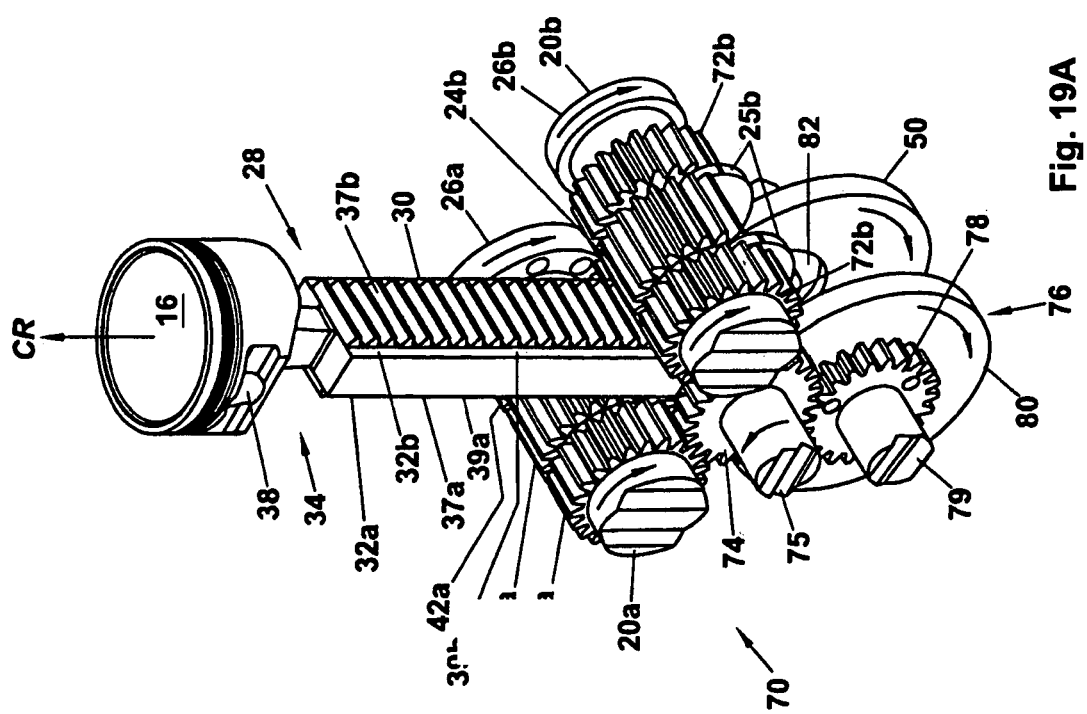
FIG. 19A is a schematic partial perspective view from a first perspective of a portion of the exemplary embodiment shown in FIG. 16.

Referring to FIGS. 18, 19A, and 19B, in exemplary engine 10, pistons 16 are operably coupled to crankshafts 20a and 20b via a number of connecting rods 28 corresponding to the number of pistons 16. In particular, exemplary connecting rods 28 have a proximal portion 30 configured for engagement with crankshafts 20a and 20b. Connecting rods 28 further have a distal portion 34 having an aperture 36 for operably coupling connecting rod 28 to a respective piston 16 via, for example, a pin 38. Connecting rod 28 further defines a longitudinal axis CR extending between the center of proximal portion 30 and aperture 36.

As shown in, for example, FIGS. 19A and 19B, exemplary proximal portion 30 of exemplary connecting rod 28 includes opposing lateral sides 32a and 32b. Opposing lateral sides 32a and 32b include respective rack gears 37a and 37b and guide surfaces 39a and 39b. Rack gears 37a and 37b are configured to engage respective gears 24a and 24b of crankshafts 20a and 20b, and guide surfaces 39a and 39b are configured to interact with respective pairs of cams 25a and 25b of crankshafts 20a and 20b, as explained in more detail herein. Thus, as used herein, the term "crankshaft" refers to a shaft that may be driven by a connecting rod, but does not necessarily refer to a shaft that includes one or more crankpins, as may be implied by conventional use of the term "crankshaft."

Referring to FIGS. 22A-34B, during operation of exemplary engine 10, piston 16 reciprocates within a respective cylinder 14, such that during a power stroke of engine 10, combustion of an air/fuel mixture within a combustion chamber defined by piston 16 and cylinder 14 (and a cylinder-head (not shown)) forces piston 16 toward crankshafts 20a and 20b. As piston 16 travels toward crankshafts 20a and 20b, rack gear 37a engages crankshaft gear 24a of crankshaft 20a, and thus, crankshaft 20a is driven clockwise (as shown) via connecting rod 28, thereby converting the potential energy associated with the air/fuel mixture into mechanical work. When piston 16 approaches the bottom of the power stroke (i.e., the end of it's travel toward crankshafts 20a and 20b (see, e.g., FIGS. 28A-30B), cam 25a of crankshaft 20a begins to engage guide surface 39a, which begins to disengage rack gear 37a from crankshaft gear 24a. As crankshaft gear 24a continues to rotate clockwise (as shown) (see FIGS. 30A and 30B), cam 25a acts against guide surface 39a such that rack gear 37b engages crankshaft gear 24b of crankshaft 20b. Thus, crankshaft gear 24b propels connecting rod 28 in a direction away from crankshafts 20a and 20b (as shown) (see FIGS. 31A-34B). As piston 16 approaches the top of its stroke, cam 25b of crankshaft 20b begins to engage guide surface 39b, which begins to disengage rack gear 37b from crankshaft gear 24b. As crankshaft gear 24b continues to rotate clockwise (as shown) (see FIGS. 34A and 34B), cam 25b acts against guide surface 39b, such that rack gear 37a engages crankshaft gear 24a of crankshaft 20a. In this exemplary, manner, connecting rod 28 engages crankshafts 20a and 20b in an alternating fashion.

Exemplary engine 10 shown in FIGS. 16-34B includes an exemplary gear train assembly 70 shown in FIGS. 18-20, which results in the exemplary operation outlined above. For example, gear train assembly 70 includes crankshaft gears 24a and 24b, transfer gears 72a and 72b, and an idler gear 74. Exemplary gear train assembly 70 is configured such that crankshaft gears 24a and 24b and transfer gears 72a and 72b rotate in the same direction (i.e., clockwise as shown in FIGS. 18, 19A, and 22A-34B, and counterclockwise as shown in FIGS. 19B and 20). Idler gear 74 rotates in the opposite direction as the other gears of exemplary gear train assembly 70.

Referring to FIG. 19A, transfer gears 72a and 72b are operably coupled in a fixed manner to respective crankshafts 20a and 20b. Idler gear 74 is operably coupled to a shaft 75, which is operably coupled to exemplary engine 10, for example, at cylinder block 12 of engine 10. Exemplary idler gear 74 engages each of transfer gears 72a and 72b, such that transfer gears 72a and 72b rotate in the same direction. Thus, as connecting rod 28 drives crankshaft 20a, thereby driving rotation of transfer gear 72a, transfer gear 72b is driven in the same direction by virtue of idler gear 74 engaging both transfer gears 72a and 72b. Further, transfer gears 72a and 72b are the same size, and thus, they rotate at the same speed. The size of idler gear 74 may be selected to be any suitable size based on, for example, convenient center spacing of the gears of gear train assembly 70.

According to the exemplary embodiment shown in FIGS. 16-34B, engine 10 includes a stroke length control assembly 76 configured to control the axial position of piston 16 within cylinder 14, for example, at the top and bottom of piston 16's stroke (i.e., at the stroke termination points defining the stroke length of piston 16's stroke). For example, gear train assembly 70 may also include a cam gear 78 operably coupled to a shaft 79 (see FIGS. 19A and 19B), which is operably coupled to exemplary engine 10, for example, at cylinder block 12 of engine 10. Cam gear 78 is also operably coupled and to a disk 80. Exemplary disk 80 includes a stroke-length cam 82 (e.g., an internal cam including a groove, as shown in FIG. 20), and exemplary connecting rod 28 includes a follower 84 formed by a finger 86 extending laterally with respect to connecting rod 28 (e.g., in a plane perpendicular to a plane extending between rack gears 37a and 37b).

In the exemplary embodiment shown, idler gear 74 is driven by one of transfer gears 72a and 72b, and thus, idler gear 74, which engages cam gear 78, drives cam gear 78 in the same direction as transfer gears 72a and 72b of respective crankshafts 20a and 20b. Exemplary cam gear 78 is the same size as transfer gears 72a and 72b, and thus, cam gear 78 is driven at the same speed as transfer gears 72a and 72b. As cam gear 78 is driven, it, in turn, drives stroke-length cam 82, which engages follower 84, which, as explained in more detail herein, assists with control of piston 16's travel within cylinder 14 at either end of its stroke.

Thus, exemplary gear train assembly 70 results in crankshafts 20a and 20b rotating in the same direction and at the same rotational speed. Further, stroke-length cam 82 is driven in the same direction and rotational speed as crankshafts 20a and 20b.

According to some embodiments, for example, as shown in FIGS. 18-21, gear train assembly 70 may include opposing pairs of each of transfer gears 72a and 72b, idler gear 74, and/or cam gear 78. For example, opposing pairs of one or more of those gears may be located on opposing longitudinal sides of crankshaft gears 24a and 24b of crankshafts 20a and 20b, for example, as shown in FIGS. 18-21. This may improve the robustness of gear train assembly 70.

As outlined previously herein, in a conventional internal combustion engine the force initially created by the air/fuel mixture at the moment of combustion does not transfer as much torque to the crankshaft as it would if the length of the moment arm between the engine's connecting rod and crankshaft's axis were greater. Thus, the efficiency of the work generated from the combustion process in a conventional internal combustion engine may be less than desired.

In contrast to a conventional engine, exemplary engine 10 shown in FIGS. 16-34B is configured such that moment arm MA remains greater than zero. More specifically, the moment arm MA of exemplary engine 10 is equal to the distance between the center of crankshaft 20a and the point of engagement between the teeth of rack gear 37a and the teeth of crankshaft gear 24a during the power stroke of piston 16 within cylinder 14. Thus, the size of crankshaft gears 24a (i.e., the pitch radius of crankshaft gears 24a) determines the length of moment arm MA, with larger crankshaft gears 24a resulting in larger moment arms MA. Note that regardless of the position of the radial axis RA, the moment arm MA remains fixed with respect to engagement between rack gear 37a and crankshaft gear 24a, and with respect to engagement between rack gear 37b and crankshaft gear 24b. As a result, in contrast to a conventional engine, exemplary engine 10 shown in FIGS. 16-34B has a significant moment arm MA even when radial axis RA is oriented at 0 degrees, which corresponds generally to a first stroke termination angle $\theta_1$ that generally coincides with the end of the compression stroke (and/or exhaust stroke) (see, e.g., FIGS. 22A and 22B). Thus, a greater amount of the energy of the combustion event may be captured because the maximum force acting on pistons 16 coincides with a greater moment arm, thereby resulting in more torque at crankshaft 20a during the power stroke. (See Table II below showing an exemplary relationship for exemplary engine 10 shown in FIGS. 16-34B between radial axis RA's angle and piston 16's displacement relative to zero degrees past first stroke termination angle $\theta_1$.)

TABLE II

RADIAL AXIS RA ANGLE VS. PISTON DISPLACEMENT RELATIVE TO ZERO DEGREES FOR EXEMPLARY ENGINE SHOWN IN FIGS. 16-34B

| Crank Angle | Piston Depth |
|---|---|
| 0 | 0.000 |
| 4 | 0.092 |
| 8 | 0.183 |
| 12 | 0.275 |
| 16 | 0.367 |

TABLE II-continued

RADIAL AXIS RA ANGLE VS. PISTON DISPLACEMENT RELATIVE TO ZERO DEGREES FOR EXEMPLARY ENGINE SHOWN IN FIGS. 16-34B

| Crank Angle | Piston Depth |
|---|---|
| 20 | 0.458 |
| 24 | 0.550 |
| 28 | 0.642 |
| 32 | 0.733 |
| 36 | 0.825 |
| 40 | 0.917 |
| 44 | 1.008 |
| 48 | 1.100 |
| 52 | 1.192 |
| 56 | 1.283 |
| 60 | 1.375 |
| 64 | 1.467 |
| 68 | 1.558 |
| 72 | 1.650 |
| 76 | 1.742 |
| 80 | 1.833 |
| 84 | 1.925 |
| 88 | 2.017 |
| 92 | 2.108 |
| 96 | 2.200 |
| 100 | 2.292 |
| 104 | 2.383 |
| 108 | 2.475 |
| 112 | 2.567 |
| 116 | 2.658 |
| 120 | 2.750 |
| 124 | 2.842 |
| 128 | 2.933 |
| 132 | 3.025 |
| 136 | 3.117 |
| 140 | 3.208 |
| 144 | 3.300 |
| 148 | 3.392 |
| 152 | 3.483 |
| 156 | 3.575 |
| 160 | 3.667 |
| 164 | 3.758 |
| 168 | 3.850 |
| 172 | 3.942 |
| 176 | 4.033 |
| 180 | 4.125 |

Referring to FIGS. 22A and 22B, radial axis RA is oriented at 0 degrees, which corresponds generally first stroke termination angle $\theta_1$, which may generally coincide with the end of the compression stroke (and/or exhaust stroke) and the beginning of the power stroke (and/or intake stroke) (i.e., the first stroke termination point of piston 16's travel). As shown in FIG. 22A, the teeth of rack gear 37a of connecting rod 28 are beginning to engage the teeth of crankshaft gear 24a as a result of cam 25b of crankshaft 20b acting against guide surface 39b to push the lower end of proximal portion 30 of connecting rod 28 to the left, as shown. As both crankshaft 20a and crankshaft 20b continue to rotate (i.e., in the same speed and direction), the teeth of rack gear 37b of connecting rod 28 become completely disengaged with crankshaft gear 24b prior to the teeth of rack gear 37a engaging with the teeth of crankshaft gear 24a. Disk 80 is at an orientation resulting in groove of stroke-length cam 82 being positioned to hold piston 16 via follower 84 of connecting rod 28 at the top end of its stroke as proximal portion 30 of connecting rod 28 is passed from engagement with crankshaft gear 24b to engagement with crankshaft gear 24a. As shown, crankshaft gears 24a and 24b and disk 80 are rotating in the clockwise direction, and at the same rotational speed by virtue of exemplary gear train assembly 70 described previously (see FIG. 22B).

Figure 23:
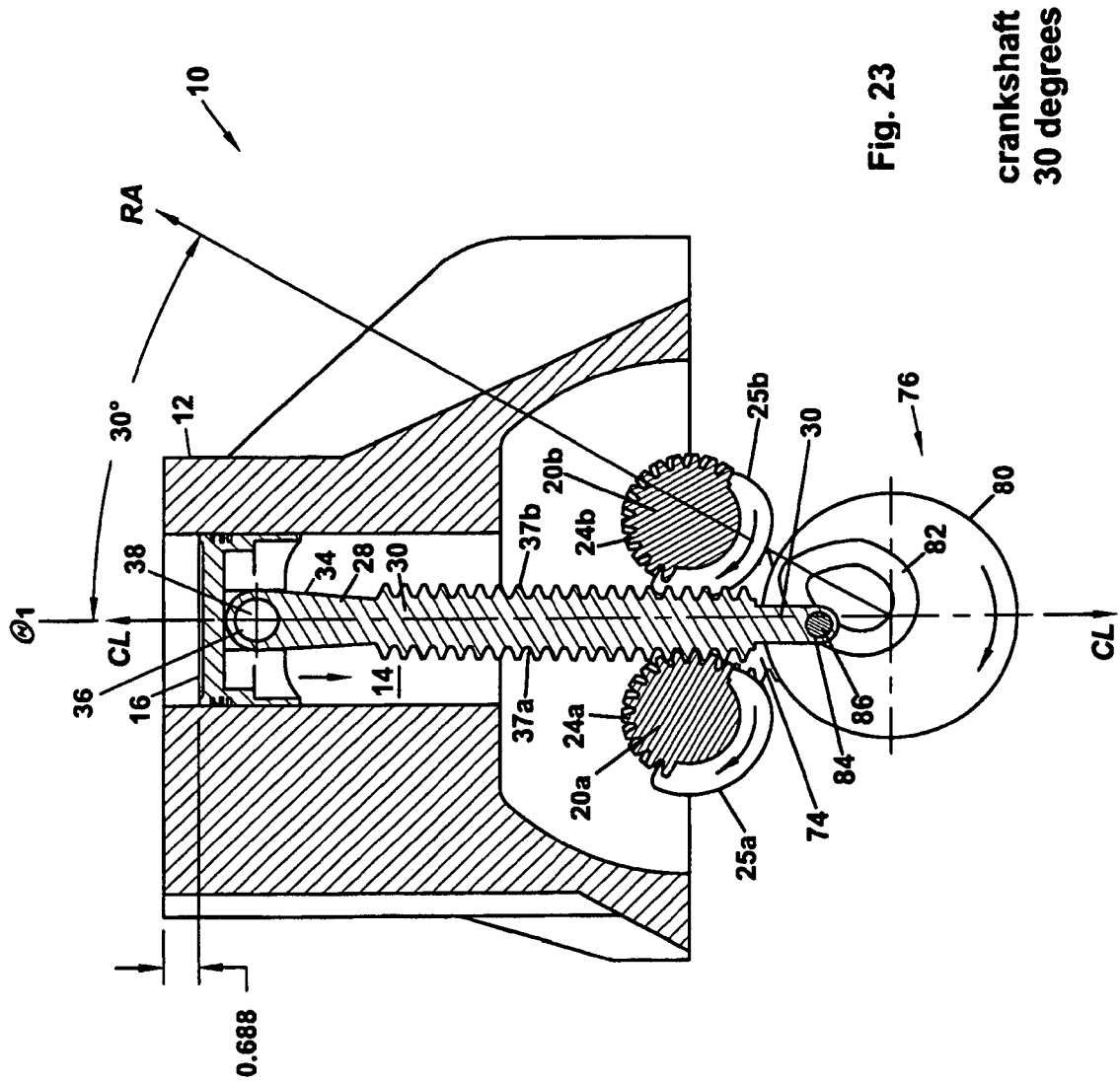
FIG. 23 is a schematic end section view taken along line. A-A in FIG. 21 with the radial axis angle of the exemplary crankshafts shown at 30 degrees.

Referring to FIG. 23, radial axis RA is oriented at 30 degrees past first stroke termination angle $\theta_1$, and the power stroke (and/or intake stroke) is beginning. (In FIGS. 22A-34B, for the sake of clarity, radial axis RA is shown as being defined by the rotation of disk 80 rather than by the rotation of crankshafts 20a and 20b, since, for the exemplary embodiment shown, disk 80 and crankshafts 20a and 20b rotate in the same speed and direction.) As can be seen from FIG. 23, the transfer of rack gear 37b of proximal portion 30 of connecting rod 28 from engagement with crankshaft gear 24b to engagement with crankshaft gear 24a has been completed. Cam 25b of crankshaft 20b continues to act against guide surface 39b and holds the teeth of rack gear 37a in engagement with the teeth of crankshaft gear 24a as connecting rod 28 is driven downward in a direction toward crankshafts 20a and 20b (as shown) by combustion acting against piston 16. Disk 80 and the groove of stroke-length cam 82 have continued to rotate, and stroke-length cam 82's groove profile permits the lateral and downward movement of connecting rod 28, with follower 84 of connecting rod 28 following the cam groove.

Figure 24:
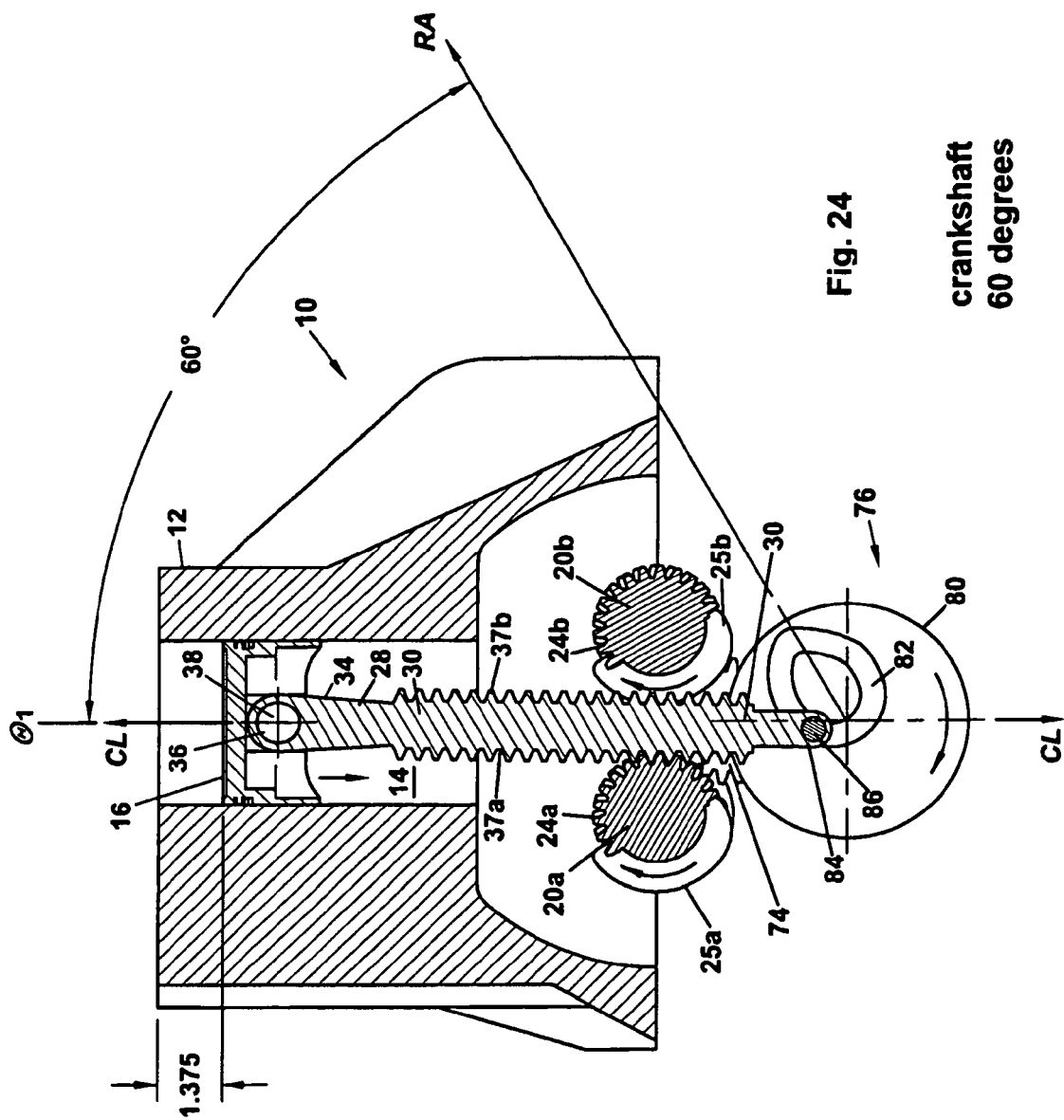
FIG. 24 is a schematic end section view taken along line A-A in FIG. 21 with the radial axis angle of the exemplary crankshafts shown at 60 degrees.

As radial axis RA revolves to a position 60 degrees past first stroke termination angle $\theta_1$, as shown in FIG. 24, cam 25b of crankshaft 20b continues to act against guide surface 39b and holds the teeth of rack gear 37a in engagement with the teeth of crankshaft gear 24a as connecting rod 28 continues to be driven downward in a direction toward crankshafts 20a and 20b (as shown) by combustion acting against piston 16. Disk 80 and the groove of stroke-length cam 82 have continued to rotate clockwise, and stroke-length cam 82's groove profile continues to permit the lateral and downward movement of connecting rod 28, with follower 84 of connecting rod 28 following the cam groove.

Figure 25:
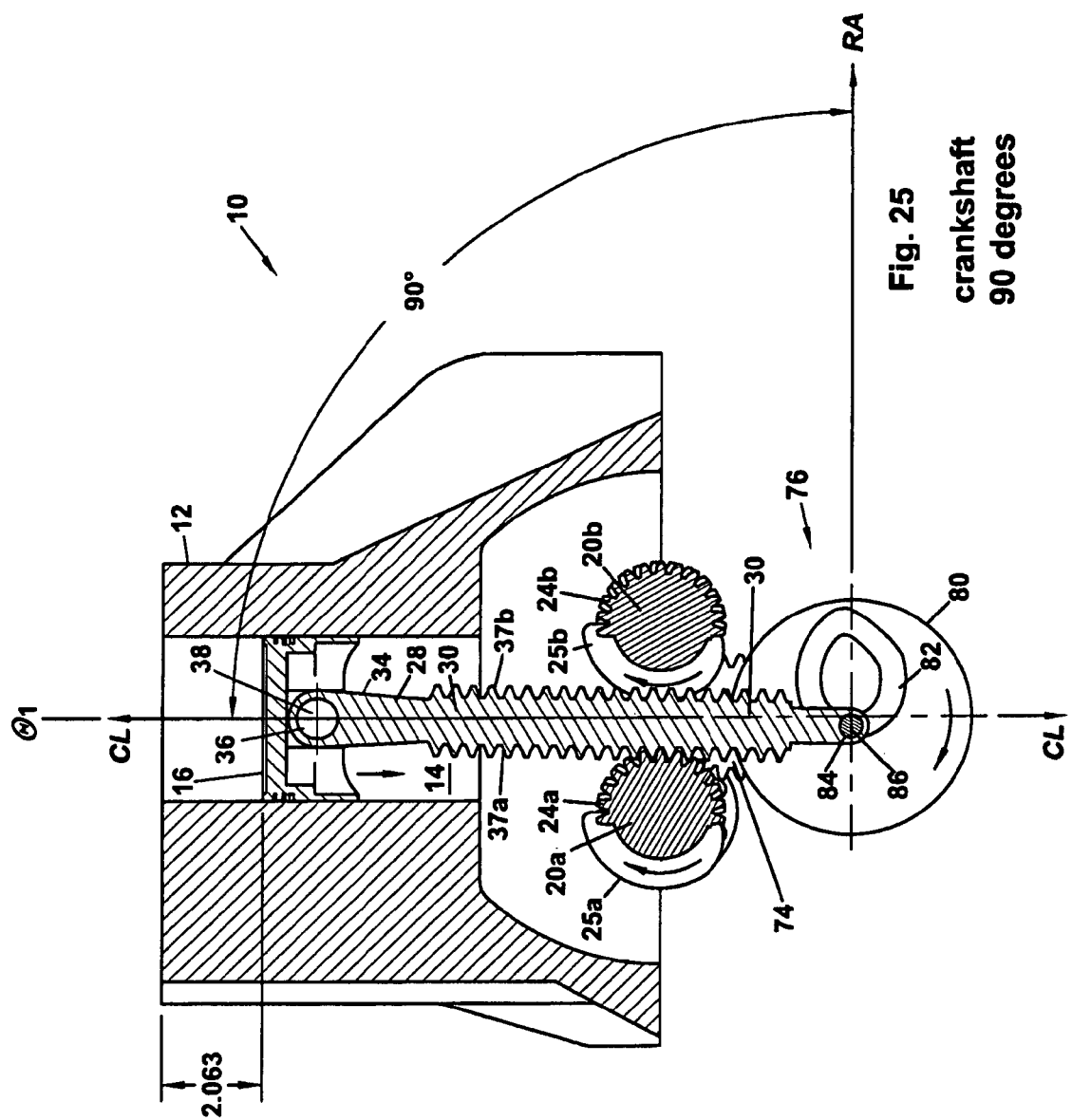
FIG. 25 is a schematic end section view taken along line A-A in FIG. 21 with the radial axis angle of the exemplary crankshafts shown at 90 degrees.

Referring to FIG. 25, radial axis RA continues to revolve to a position 90 degrees past first stroke termination angle $\theta_1$, and cam 25b of crankshaft 20b continues to act against guide surface 39b and holds the teeth of rack gear 37a in engagement with the teeth of crankshaft gear 24a as connecting rod 28 continues to be driven downward in a direction toward crankshafts 20a and 20b (as shown) by combustion acting against piston 16. Disk 80 continues to rotate clockwise and stroke-length cam 82's groove profile continues to permit the lateral and downward movement of follower 84 of connecting rod 28.

Figure 26:
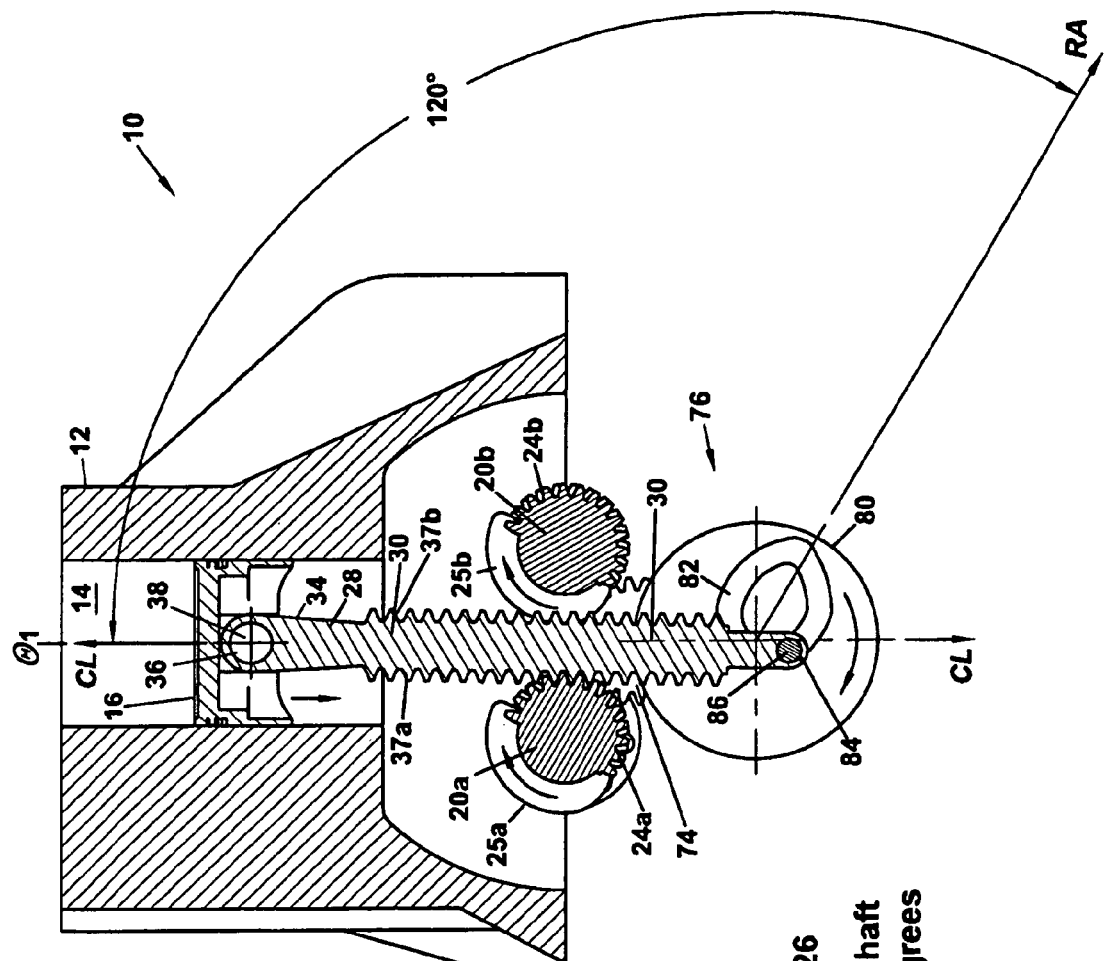
FIG. 26 is a schematic end section view taken along line A-A in FIG. 21 with the radial axis angle of the exemplary crankshafts shown at 120 degrees.

Referring to FIG. 26, radial axis RA continues to revolve to a position 120 degrees past first stroke termination angle $\theta_1$, and cam 25b of crankshaft 20b continues to act against guide surface 39b and holds the teeth of rack gear 37a in engagement with the teeth of crankshaft gear 24a as connecting rod 28 continues to be driven downward in a direction toward crankshafts 20a and 20b (as shown) by combustion acting against piston 16. Disk 80 continues to rotate clockwise and stroke-length cam 82's groove profile continues to permit the lateral and downward movement of follower 84 of connecting rod 28.

Figure 27A:
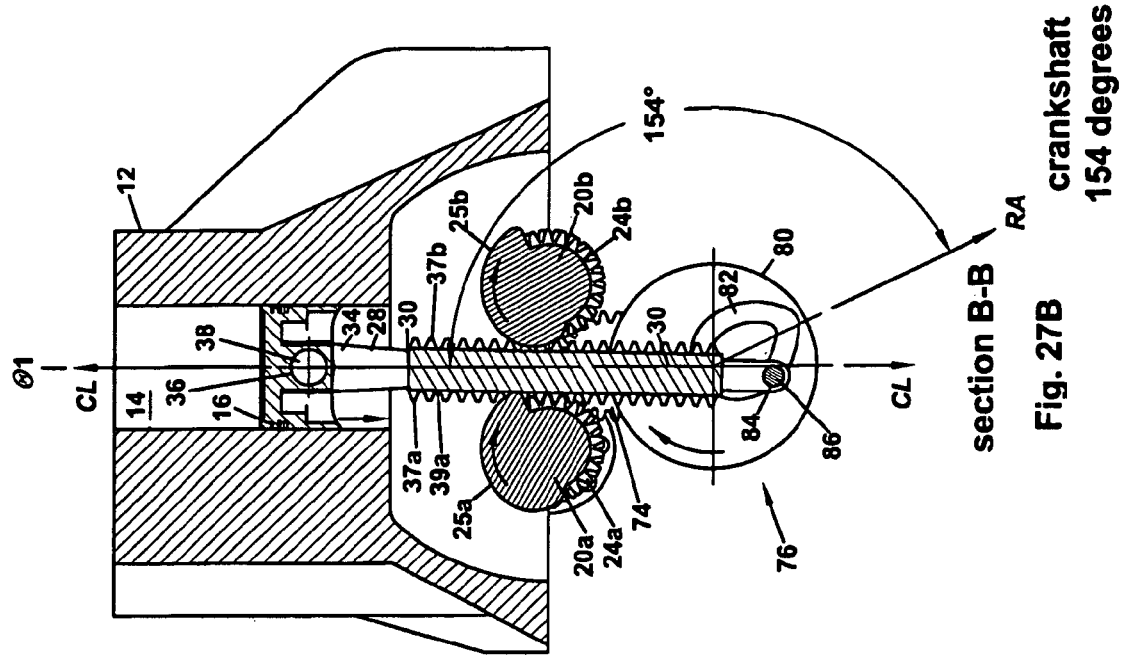
FIG. 27A is a schematic end section view taken along line A-A in FIG. 21 with the radial axis angle of the exemplary crankshafts shown at 154 degrees.
Figure 27B:
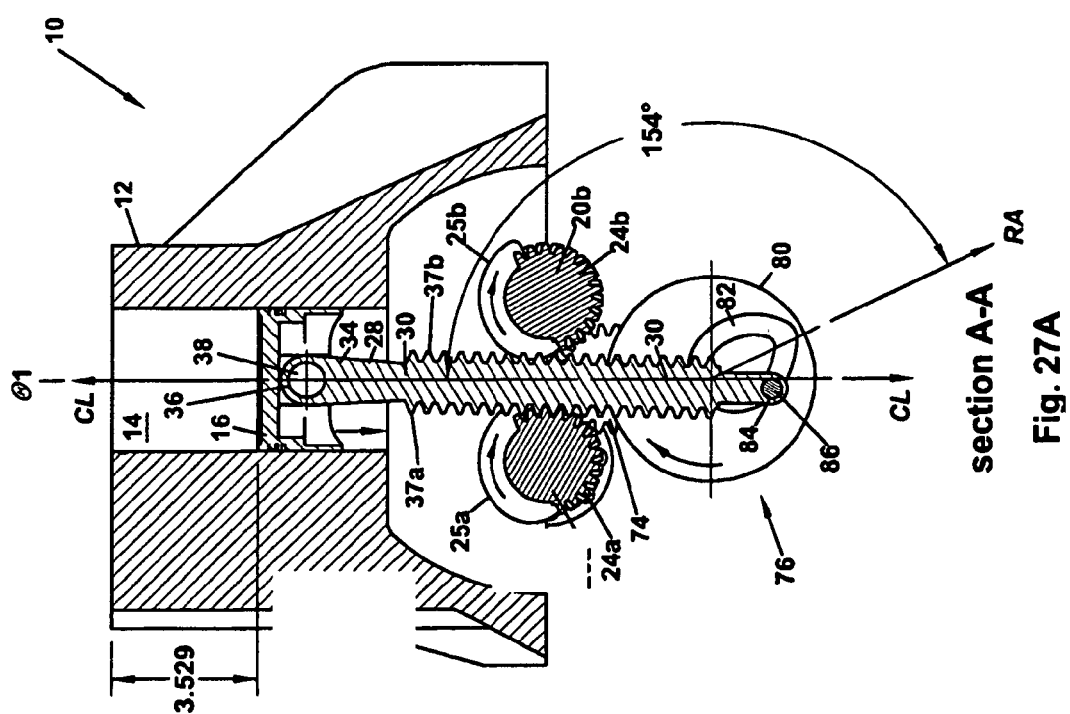
FIG. 27B is a schematic end section view taken along line B-B in FIG. 21 with the radial axis angle of the exemplary crankshafts shown at 154 degrees.

FIGS. 27A and 27B show radial axis RA at a position 154 degrees past first stroke termination angle $\theta_1$. As can be seen in FIG. 27B, cam 25a of crankshaft 20a is beginning to rotate to a position in which it will begin to act against guide surface 39a as cam 25b of crankshaft 20b is beginning to withdraw from guide surface 39b. Nevertheless, cam 25b of crankshaft 20b still continues to act against guide surface 39b and holds the teeth of rack gear 37a in engagement with the teeth of crankshaft gear 24a as connecting rod 28 continues to be driven downward in a direction toward crankshafts 20a and 20b (as shown) by combustion acting against piston 16. Disk 80 continues to rotate clockwise and stroke-length cam 82's groove profile continues to permit downward movement of follower 84 of connecting rod 28, but lateral movement of follower 84 has reached a leftward maximum.

Figure 28B:
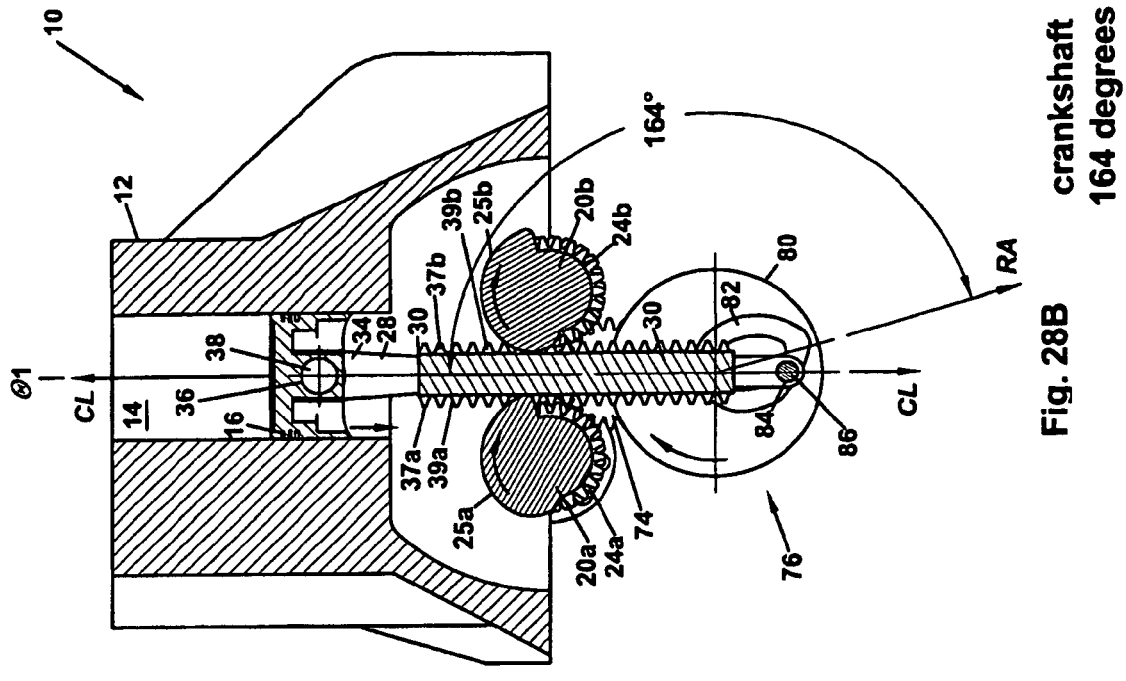
FIG. 28B is a schematic end section view taken along line B-B in FIG. 21 with the radial axis angle of the exemplary crankshafts shown at 164 degrees.
Figure 28A:
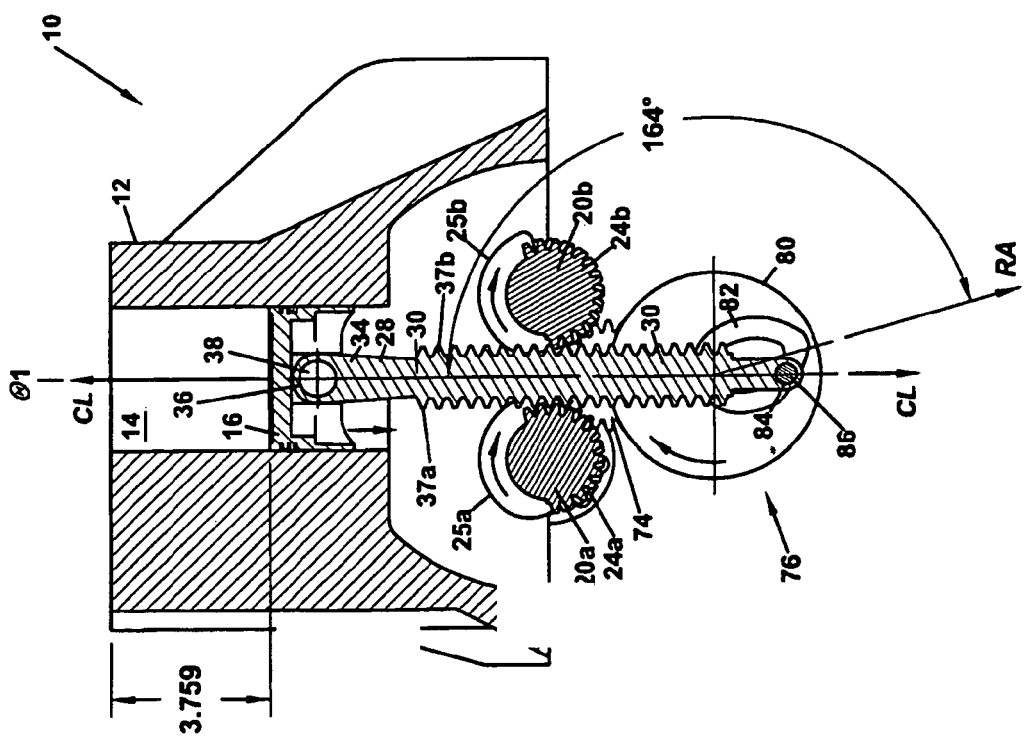
FIG. 28A is a schematic end section view taken along line A-A in FIG. 21 with the radial axis angle of the exemplary crankshafts shown at 164 degrees.

As can be seen in FIGS. 28A and 28B, radial axis RA has revolved to a position 164 degrees past first stroke termination angle $\theta_1$, and engagement between rack gear 37a and crankshaft gear 24a is beginning to be transferred to engagement between rack gear 37b and crankshaft gear 24b. As can be seen in FIG. 28B, cam 25a of crankshaft 20a has rotated to a position in which it is acting against guide surface 39a as cam 25b of crankshaft 20b is beginning to withdraw from guide surface 39b. As shown, proximal portion 30 of connecting rod 28 has moved back to the right (as shown), such that the longitudinal axis CR of connecting rod 28 is approaching a co-linear relationship with the longitudinal axis CL of cylinder 14. At this point, rack gear 37a is becoming disengaged from crankshaft gear 24a. Disk 80 continues to rotate clockwise, and stroke-length cam 82's groove profile continues to permit the downward movement of follower 84 of connecting rod 28 as the power stroke of piston 16 approaches its downward limit (i.e., its second stroke termination point).

Figure 29B:
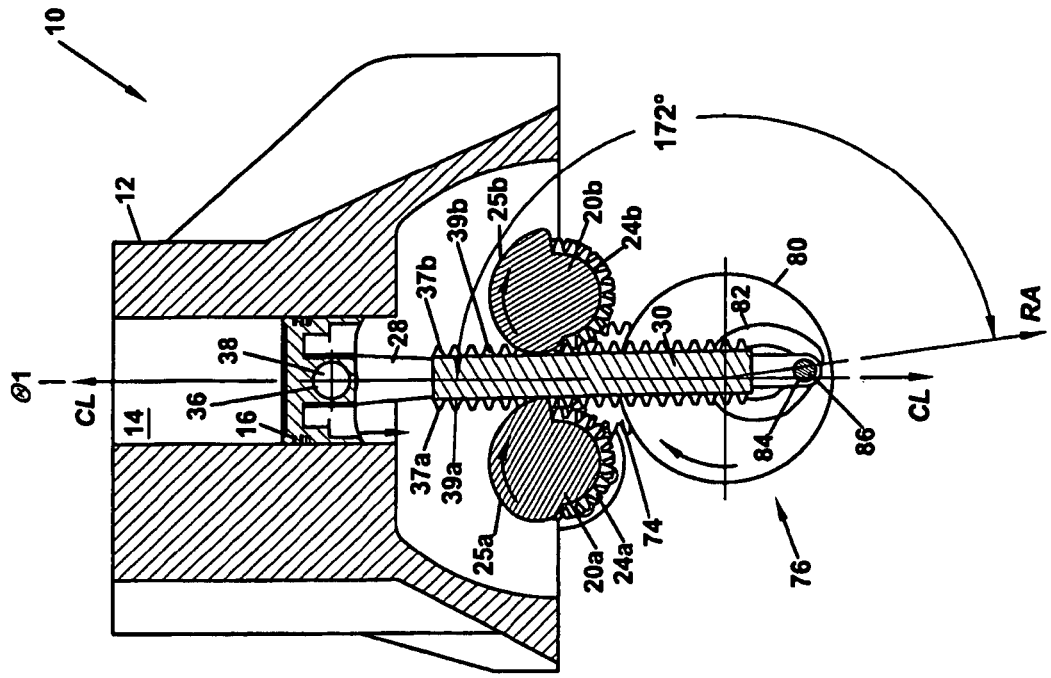
FIG. 29B is a schematic end section view taken along line B-B in FIG. 21 with the radial axis angle of the exemplary crankshafts shown at 172 degrees.
Figure 29A:
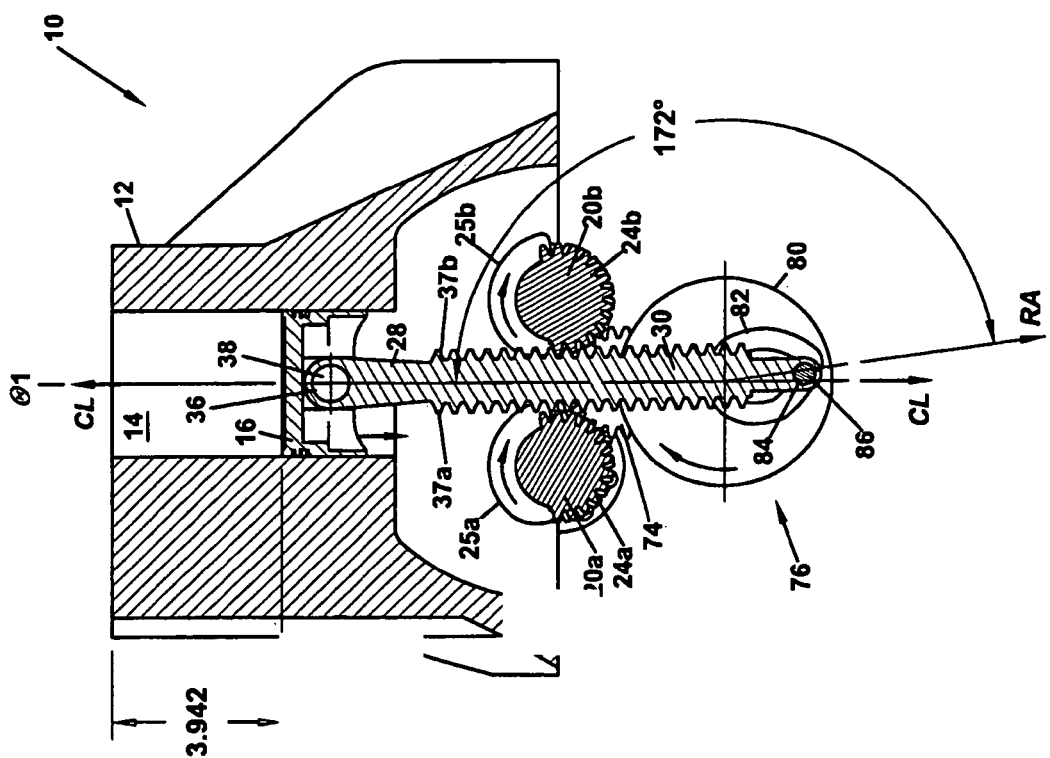
FIG. 29A is a schematic end section view taken along line A-A in FIG. 21 with the radial axis angle of the exemplary crankshafts shown at 172 degrees.

Referring to FIGS. 29A and 29B, radial axis RA has revolved to a position 172 degrees past first stroke termination angle $\theta_1$, and engagement between rack gear 37a and crankshaft gear 24a is being transferred to engagement between rack gear 37b and crankshaft gear 24b. As can be seen in FIG. 29B, cam 25a of crankshaft 20a has rotated to a position in which it is acting against guide surface 39a and cam 25b of crankshaft 20b has withdrawn from guide surface 39b. Proximal portion 30 of connecting rod 28 has moved farther to the right, such that the longitudinal axis CR of connecting rod 28 has moved to a position to the right of the longitudinal axis. CL of cylinder 14. At this point, rack gear 37a is disengaged from crankshaft gear 24a, and rack gear 37b is beginning to engage crankshaft gear 24b of crankshaft 20b. Disk 80 continues to rotate clockwise, and stroke-length cam 82's groove profile is beginning to constrain downward movement of follower 84 of connecting rod 28 as the power stroke of piston 16 get closer to its downward limit relative to FIGS. 28A and 28B.

Figure 30A:
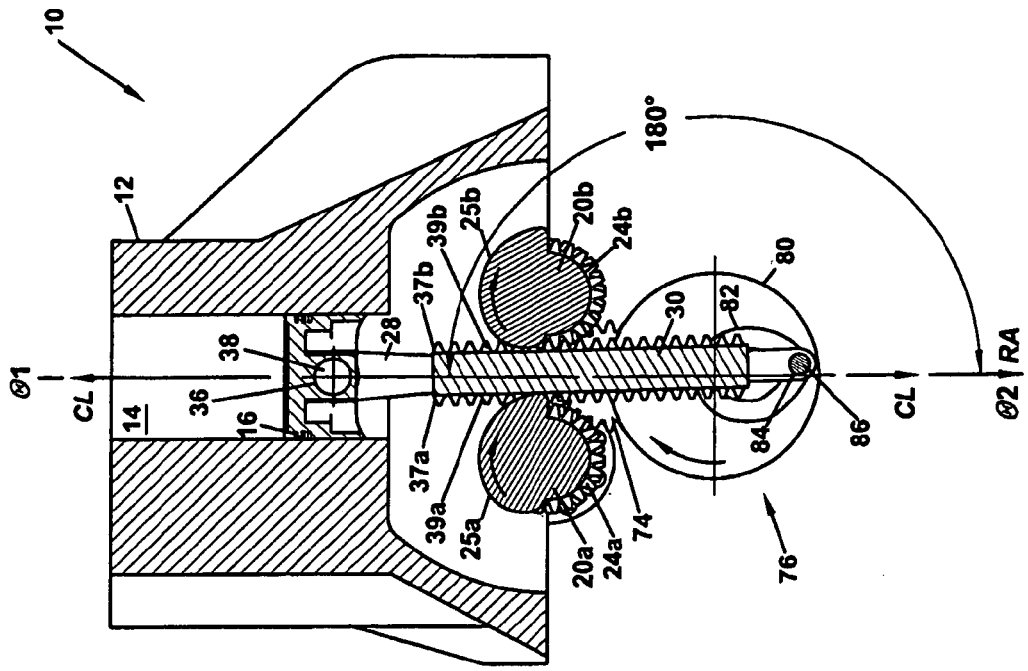
FIG. 30A is a schematic end section view taken along line A-A in FIG. 21 with the radial axis angle of the exemplary crankshafts shown at 180 degrees.
Figure 30B:
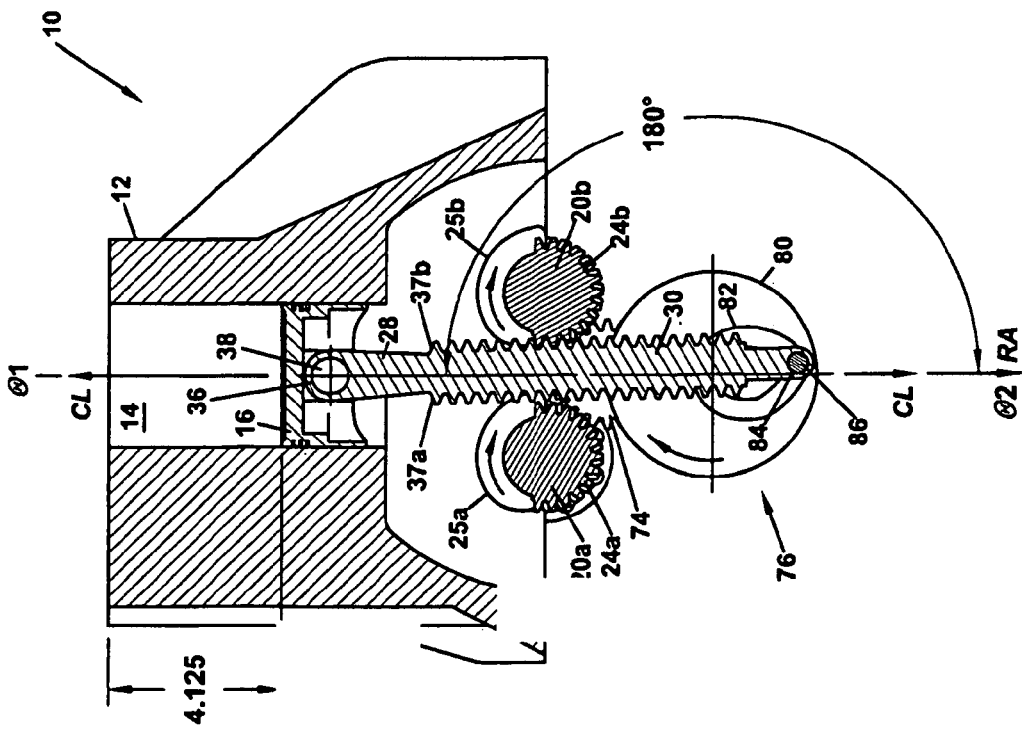
FIG. 30B is a schematic end section view taken along line B-B in FIG. 21 with the radial axis angle of the exemplary crankshafts shown at 180 degrees.

As shown in FIGS. 30A and 30B, radial axis RA has revolved to a position 180 degrees past first stroke termination angle $\theta_1$ (i.e., to a second stroke termination angle $\theta_2$, which coincides with a second stroke termination point of piston 16's travel), and thus, piston 16 has reached the end of its downward stroke. Engagement between rack gear 37a and crankshaft gear 24a has been transferred completely to engagement between rack gear 37b and crankshaft gear 24b. Cam 25a of crankshaft 20a has rotated to a position in which it is acting against guide surface 39a, and cam 25b of crankshaft 20b has withdrawn from guide surface 39b. Proximal portion 30 of connecting rod 28 has moved farther to the right, such that the longitudinal axis CR of connecting rod 28 has moved to a position to the right of the longitudinal axis CL of cylinder 14. At this point, rack gear 37b is engaged with crankshaft gear 24b of crankshaft 20b. Disk 80 continues to rotate clockwise, and stroke-length cam 82's groove profile prevents any further downward movement of follower 84 of connecting rod 28, as the power stroke of piston 16 reaches the limit of its downward travel (i.e., the second stroke termination point).

Upon radial axis RA reaching a position 180 degrees past first stroke termination angle $\theta_1$, crankshaft 20a is no longer driven by piston 16 and connecting rod 28. Crankshaft 20b now drives piston 16 and connecting rod 28 upward within cylinder 14 in a direction away from crankshafts 20a and 20b during an exhaust stroke (and/or a compression stroke). For example, crankshaft 20b may be driven by a power stroke in another one of cylinders 14 of exemplary engine 10 by virtue of the radial offset between crankshaft gears 24 (see FIG. 17) and/or rotation of a flywheel.

Figure 31A:
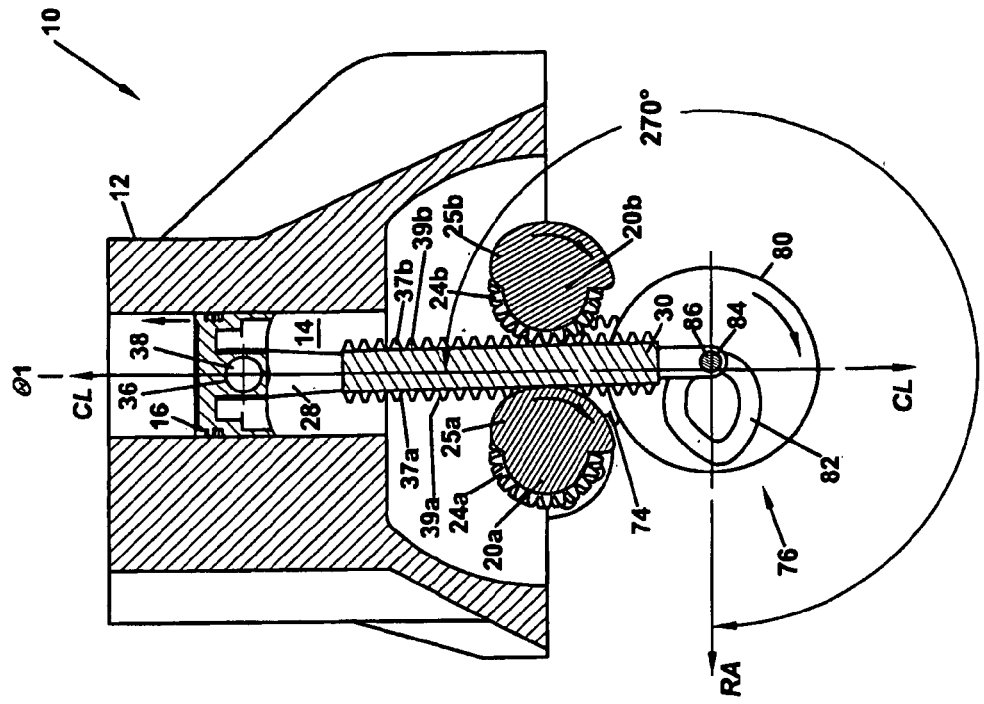
FIG. 31A is a schematic end section view taken along line A-A in FIG. 21 with the radial axis angle of the exemplary crankshafts shown at 270 degrees.
Figure 31B:
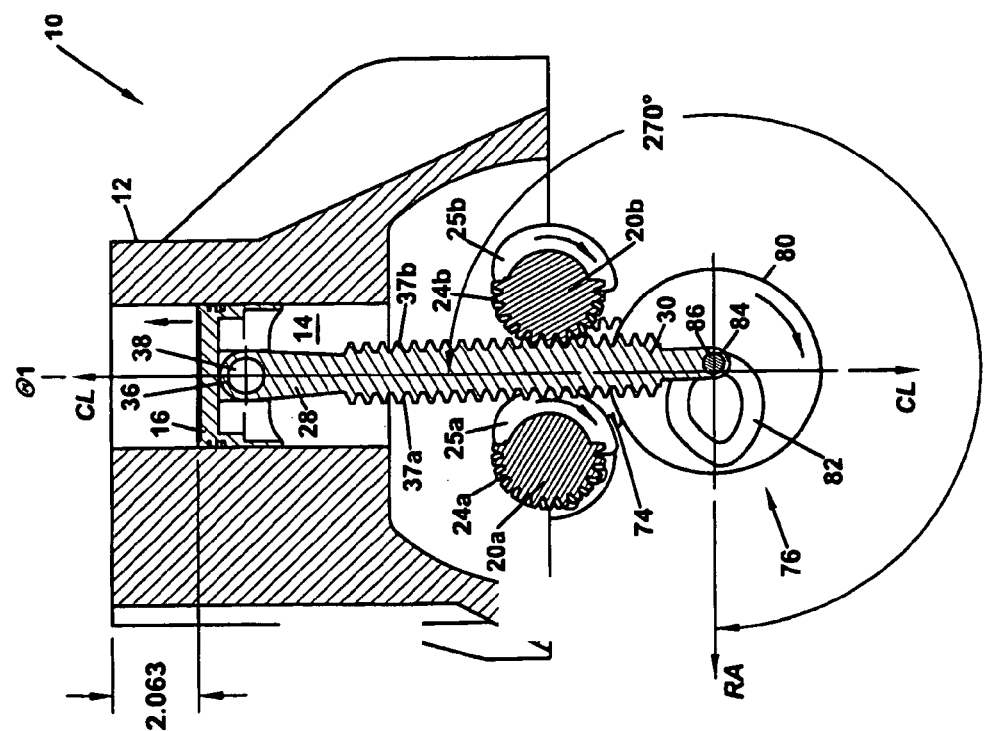
FIG. 31 B is a schematic end section view taken along line B-B in FIG. 21 with the radial axis angle of the exemplary crankshafts shown at 270 degrees.

As shown in FIGS. 31A and 31B, radial axis RA has revolved to a position 270 degrees past first stroke termination angle $\theta_1$, and thus, piston 16 is traveling upward within cylinder 14 in a direction away from crankshafts 20a and 20b. Cam 25a of crankshaft 20a continues to act against guide surface 39a and holds the teeth of rack gear 37b in engagement with the teeth of crankshaft gear 24b as connecting rod 28 continues to be driven upward. Disk 80 continues to rotate clockwise, and stroke-length cam 82's groove profile continues to permit the lateral and upward movement of follower 84 of connecting rod 28.

Figure 32B:
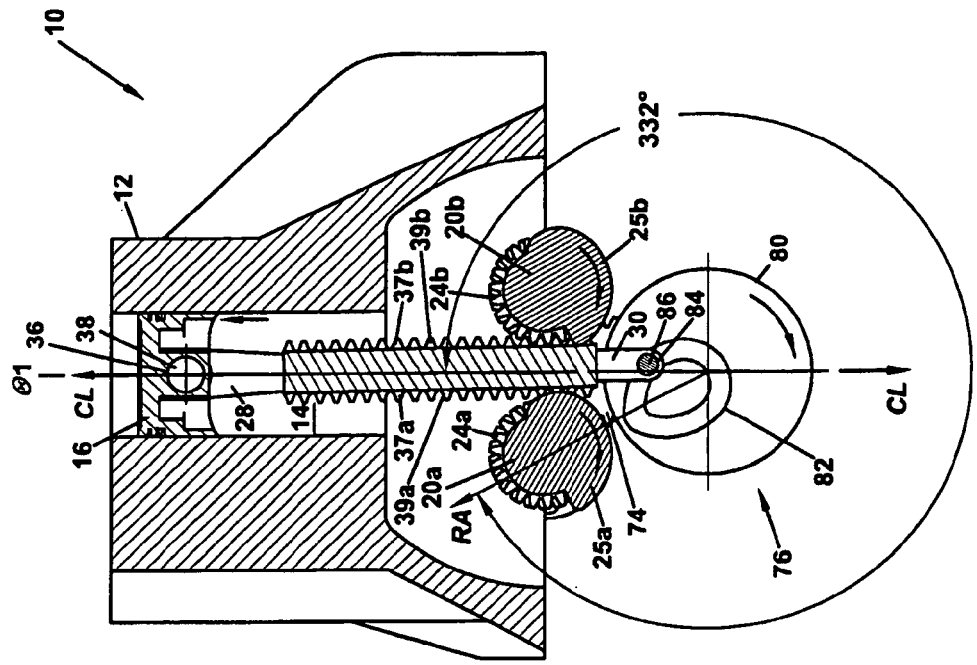
FIG. 32B is a schematic end section view taken along line B-B in FIG. 21 with the radial axis angle of the exemplary crankshafts shown at 332 degrees.
Figure 32A:
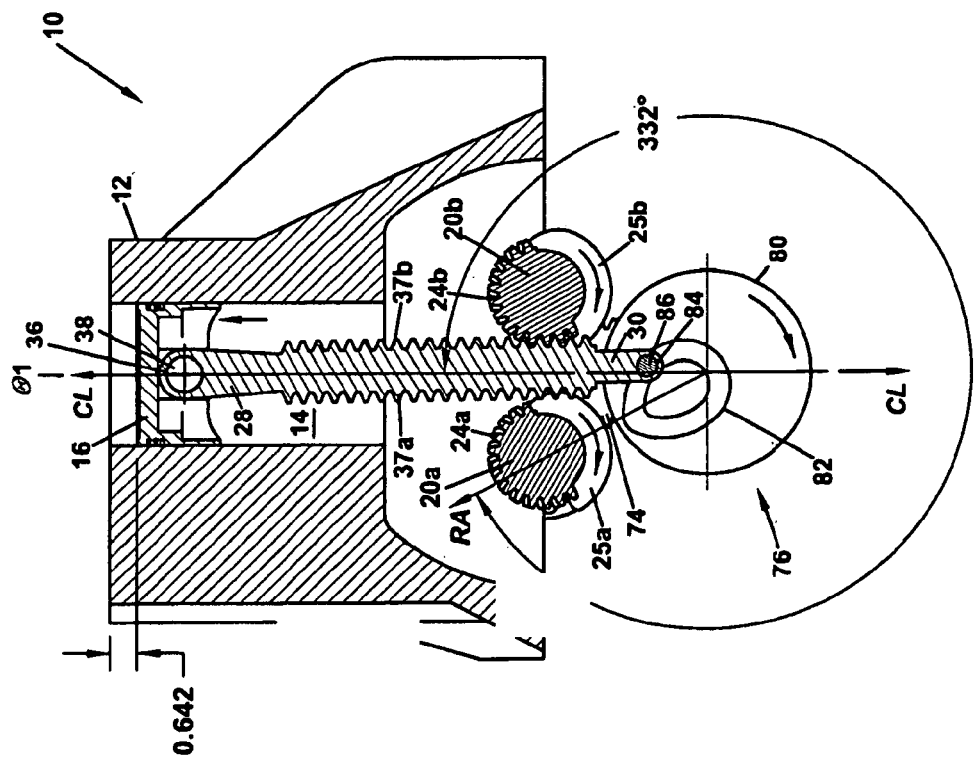
FIG. 32A is a schematic end section view taken along line A-A in FIG. 21 with the radial axis angle of the exemplary crankshafts shown at 332 degrees.

Referring to FIGS. 32A and 32B, radial axis RA has revolved to a position 332 degrees past first stroke termination angle $\theta_1$, and engagement between rack gear 37b and crankshaft gear 24b is beginning to be transferred to engagement between rack gear 37a and crankshaft gear 24a. As can be seen in FIG. 32B, cam 25b of crankshaft 20b has rotated to a position in which it is acting against guide surface 39b as cam 25a of crankshaft 20a is beginning to withdraw from guide surface 39a. As shown, proximal portion 30 of connecting rod 28 has started to move back to the left (as shown), such that the longitudinal axis CR of connecting rod 28 is beginning to approach a co-linear relationship with the longitudinal axis CL of cylinder 14. At this point, rack gear 37b is just beginning to disengage from crankshaft gear 24b. Disk 80 continues to rotate clockwise, and stroke-length cam 82's groove profile continues to permit the upward movement of follower 84 of connecting rod 28 as the exhaust stroke (and/or compression stroke) of piston 16 approaches its upward limit.

As shown in FIGS. 33A and 33B, radial axis RA has revolved to a position 346 degrees past first stroke termination angle $\theta_1$, and engagement between rack gear 37b and crankshaft gear 24b is being transferred to engagement between rack gear 37a and crankshaft gear 24a. As can be seen in FIG. 33B, cam 25b of crankshaft 20b has rotated to a position in which it is acting against guide surface 39b, and cam 25a of crankshaft 20a has withdrawn from guide surface 39a. Proximal portion 30 of connecting rod 28 has moved farther to the left, such that the longitudinal axis CR of connecting rod 28 has moved to a position generally co-linear with the longitudinal axis CL of cylinder 14. At this point, rack gear 37b is disengaged from crankshaft gear 24b, and rack gear 37a is beginning to engage crankshaft gear 24a of crankshaft 20a. Disk 80 continues to rotate clockwise, and stroke-length cam 82's groove profile is beginning to constrain upward movement of follower 84 of connecting rod 28, as the exhaust stroke of piston 16 approaches its upward limit.

As shown in FIGS. 34A and 34B, radial axis RA has revolved to a position 360 degrees past first stroke termination angle $\theta_1$ (or back to first stroke termination angle $\theta_1$), and thus, piston 16 has reached the end of its upward stroke (i.e., its stroke termination point). Engagement between rack gear 37b and crankshaft gear 24b has been transferred completely to engagement between rack gear 37a and crankshaft gear 24a. Cam 25b of crankshaft 20b has rotated to a position in which it is acting against guide surface 39b, and cam 25a of crankshaft 20a has withdrawn from guide surface 39a. Proximal portion 30 of connecting rod 28 has moved to a position such that the longitudinal axis CR of connecting rod 28 is slightly to the left of the longitudinal axis CL of cylinder 14. At this point, rack gear 37a is engaged with crankshaft gear 24a of crankshaft 20a. Disk 80 continues to rotate clockwise, and stroke-length cam 82's groove profile prevents any further upward movement of follower 84 of connecting rod 28, as the exhaust stroke (and/or compression stroke) of piston 16 reaches the limit of its upward travel.

According to the exemplary embodiment shown in FIGS. 16-34B, the size of crankshaft gears 24a and/or 24b may be changed to affect performance characteristics of exemplary engine 10. For example, by increasing the size of crankshaft gears 24a and 24b (i.e., increasing the pitch radius of the gears), a greater moment arm MA may be created between the center of crankshafts 20a and 20b and connecting rod 28.

Exemplary engine 10 shown in FIGS. 16-34B may be incorporated into a power train, for example, including a transmission operably coupled to engine 10 and a drive member configured to perform work, the drive member being operably coupled to the transmission. For example, the drive member may include a propulsion device, such as, for example, a wheel or a propeller. According to some embodiments, such a power train may include a generator configured to convert rotational power into electrical power, the generator being operably coupled to exemplary engine 10. Such a power train may include a power storage device (e.g., one or more batteries) operably coupled to the generator and configured to store electrical power. According to some embodiments, the transmission may include one or more electric motors.

Moreover, exemplary engine 10 may be incorporated into a vehicle including a transmission operably coupled to engine 10 and a drive member configured to perform work and being operably coupled to the transmission. For example, the drive member may include a propulsion device, such as, for example, a wheel or a propeller. For example, the vehicle may be a car, van, truck, boat, ship, train, or air vehicle. Such a vehicle may include exemplary engine 10 operably coupled to a generator configured to convert rotational power into electrical power, and a power storage device operably coupled to the generator and configured to store electrical power. The transmission may be, for example, an electric motor.

At least some portions of exemplary embodiments of the systems outlined above may used in association with portions of other exemplary embodiments. Moreover, at least some of the exemplary embodiments disclosed herein may be used independently from one another and/or in combination with one another and may have applications to internal combustion engines not disclosed herein.

It will be apparent to those skilled in the art that various modifications and variations can be made to the structures and methodologies described herein. Thus, it should be understood that the invention is not limited to the subject matter discussed in the description. Rather, the present invention is intended to cover modifications and variations.

What is claimed is:

1. An internal combustion engine comprising:
    a cylinder block defining a cylinder having a longitudinal cylinder axis;
    a crankshaft rotatably received by the cylinder block, the crankshaft comprising a crankshaft gear and having a radial axis configured to rotate about a longitudinal axis of the crankshaft;
    a piston configured to reciprocate within the cylinder between spaced stroke termination points defining a stroke of the piston;

a connecting rod operably coupled to the piston, the connecting rod comprising a gear configured to engage the crankshaft gear, wherein the crankshaft gear and the gear of the connecting rod are configured to engage one another, such that as the piston travels within the cylinder, the connecting rod rotates the crankshaft via engagement between the crankshaft gear and the gear of the connecting rod, wherein travel of the piston from a first stroke termination point to a second stroke termination point results in less than a full rotation of the crankshaft, and wherein the crankshaft comprises a single crankshaft.

2. The engine of claim 1, wherein the gear of the connecting rod comprises an internal gear defining an aperture, and wherein the crankshaft is received in the aperture such that the crankshaft gear engages the internal gear.

3. The engine of claim 2, wherein the aperture defines opposing curved portions and opposing side portions, wherein the opposing curved portions are separated from one another along a longitudinal axis defined by the connecting rod.

4. The engine of claim 3, wherein the engine is configured such that the piston reverses direction of travel upon reaching the stroke termination points, and wherein the opposing curved portions of the internal gear are configured such that as the crankshaft rotates, reversal of the direction of travel of the piston within the cylinder is delayed after the radial axis of the crankshaft is substantially parallel to the longitudinal cylinder axis.

5. The engine of claim 4, wherein the reversal of the direction of travel of the piston is delayed until the crankshaft rotates such that the radial axis is at least about 10 degrees past the angle at which the radial axis of the crankshaft is substantially parallel to the longitudinal cylinder axis.

6. The engine of claim 4, wherein the reversal of the direction of travel of the piston is delayed until the crankshaft rotates at least about 20 degrees past the angle at which the radial axis of the crankshaft is substantially parallel to the longitudinal cylinder axis.

7. The engine of claim 4, wherein the reversal of the direction of travel of the piston is delayed until the crankshaft rotates at least about 30 degrees past the angle at which the radial axis of the crankshaft is substantially parallel to the longitudinal cylinder axis.

8. The engine of claim 4, wherein the reversal of the direction of travel of the piston is delayed until the crankshaft rotates at least about 40 degrees past the angle at which the radial axis of the crankshaft is substantially parallel to the longitudinal cylinder axis.

9. The engine of claim 2, further comprising a retainer assembly operably coupled to the crankshaft and the connecting rod, wherein the retainer assembly is configured to maintain engagement between the crankshaft gear and the internal gear of the connecting rod.

10. The engine of claim 9, wherein the retainer assembly comprises a plate having an aperture receiving the crankshaft.

11. The engine of claim 10, wherein the connecting rod comprises a ridge around the aperture defined by the internal gear of the connecting rod, and wherein the retainer assembly further comprises a follower configured to follow the ridge as the crankshaft rotates and the internal gear of the connecting rod orbits around the crankshaft.

12. A power train comprising:
the engine of claim 1;
a transmission operably coupled to the engine; and
a drive member configured to perform work, the drive member being operably coupled to the transmission.

13. The power train of claim 12, wherein the drive member comprises a propulsion device.

14. The power train of claim 13, wherein the propulsion device comprises at least one of a wheel and a propeller.

15. The power train of claim 12, further comprising:
a generator configured to convert rotational power into electrical power, the generator being operably coupled to the engine; and
a power storage device configured to store electrical power, the power storage device being operably coupled to the generator,
wherein the transmission comprises an electric motor.

16. A vehicle comprising:
the engine of claim 1;
a transmission operably coupled to the engine; and
a drive member configured to perform work, the drive member being operably coupled to the transmission.

17. The vehicle of claim 16, wherein the drive member comprises a propulsion device.

18. The vehicle of claim 17, wherein the propulsion device comprises at least one of a wheel and a propeller.

19. The vehicle of claim 16, further comprising:
a generator configured to convert rotational power into electrical power, the generator being operably coupled to the engine; and
a power storage device configured to store electrical power, the power storage device being operably coupled to the generator,
wherein the transmission comprises an electric motor.

20. The vehicle of claim 16, wherein the vehicle comprises one of a car, van, truck, boat, ship, train, and air vehicle.

21. An internal combustion engine comprising:
a cylinder block defining a cylinder having a longitudinal cylinder axis;
a crankshaft rotatably received by the cylinder block, the crankshaft comprising a crankshaft gear and having a radial axis configured to rotate about a longitudinal axis of the crankshaft;
a piston configured to reciprocate within the cylinder between spaced stroke termination points defining a stroke of the piston; and
a connecting rod operably coupled to the piston, the connecting rod comprising a gear configured to engage the crankshaft gear,
wherein the crankshaft gear and the gear of the connecting rod are configured to engage one another, such that as the piston travels within the cylinder, the connecting rod rotates the crankshaft via engagement between the crankshaft gear and the gear of the connecting rod,
wherein the crankshaft comprises a single crankshaft,
wherein the gear of the connecting rod comprises an internal gear defining an aperture, and the crankshaft is received in the aperture such that the crankshaft gear engages the internal gear,
wherein the engine further comprises a retainer assembly operably coupled to the crankshaft and the connecting rod,
wherein the retainer assembly is configured to maintain engagement between the crankshaft gear and the internal gear of the connecting rod, and wherein the engine is configured such that the crankshaft rotates in a first direction and the retainer assembly rotates around the crankshaft in a direction opposite to the first direction.

22. A power train comprising:
the engine of claim 21;
a transmission operably coupled to the engine; and
a drive member configured to perform work, the drive member being operably coupled to the transmission.

23. The power train of claim 22, further comprising:
a generator configured to convert rotational power into electrical power, the generator being operably coupled to the engine; and
a power storage device configured to store electrical power, the power storage device being operably coupled to the generator,
wherein the transmission comprises an electric motor.

24. An internal combustion engine comprising:
a cylinder block defining a cylinder having a longitudinal cylinder axis;
a crankshaft rotatably received by the cylinder block, the crankshaft comprising a crankshaft gear and having a radial axis configured to rotate about a longitudinal axis of the crankshaft;
a piston configured to reciprocate within the cylinder between spaced stroke termination points defining a stroke of the piston; and
a connecting rod operably coupled to the piston, the connecting rod comprising a gear configured to engage the crankshaft gear,
wherein the crankshaft gear and the gear of the connecting rod are configured to engage one another, such that as the piston travels within the cylinder, the connecting rod rotates the crankshaft via engagement between the crankshaft gear and the gear of the connecting rod,
wherein the engine further comprises a retainer assembly operably coupled to the crankshaft and the connecting rod, the retainer assembly being configured to maintain engagement between the crankshaft gear and the internal gear of the connecting rod,
wherein the retainer assembly comprises a plate having an aperture receiving the crankshaft,
wherein the connecting rod comprises a ridge around the aperture defined by the internal gear of the connecting rod,
wherein the retainer assembly further comprises a follower configured to follow the ridge as the crankshaft rotates and the internal gear of the connecting rod orbits around the crankshaft, and
wherein the retainer assembly further comprises a biasing member coupled to the plate and the follower, the biasing member being configured to maintain contact between the follower and the ridge of the connecting rod.

25. The engine of claim 24, wherein the follower comprises a first follower and the retainer assembly further comprises a second follower configured to follow the ridge as the crankshaft rotates and the internal gear of the connecting rod orbits around the crankshaft.

26. The engine of claim 25, wherein the internal gear of the connecting rod is sandwiched between the second follower and the crankshaft.

27. The engine of claim 26, wherein the retainer assembly is configured such that the first follower pivots with respect to the plate and second follower is fixed with respect to the plate.

28. An internal combustion engine comprising:
a cylinder block defining a cylinder having a longitudinal cylinder axis;
a crankshaft rotatably received by the cylinder block, the crankshaft comprising a crankshaft gear and having a radial axis configured to rotate about a longitudinal axis of the crankshaft;
a piston configured to reciprocate within the cylinder between spaced stroke termination points defining a stroke of the piston; and
a connecting rod operably coupled to the piston, the connecting rod having a longitudinal connecting rod axis,
wherein the crankshaft gear and the gear of the connecting rod are configured to engage one another, such that as the piston travels within the cylinder, the connecting rod rotates the crankshaft via engagement between the crankshaft gear and the gear of the connecting rod,
wherein the crankshaft comprises a first crankshaft having a first crankshaft gear,
wherein the engine further comprises a second crankshaft rotatably received by the cylinder block, the second crankshaft comprising a second crankshaft gear and being configured to rotate along its longitudinal axis,
wherein the connecting rod comprises an elongate portion having opposing lateral sides, a first rack gear associated with a first one of the opposing lateral sides, and a second rack gear associated with a second one of the opposing lateral sides, and
wherein the engine is configured such that the first rack gear is configured to engage the first crankshaft gear when the longitudinal connecting rod axis is in a first lateral position relative to the longitudinal cylinder axis, and the second rack gear is configured to engage the second crankshaft gear when the longitudinal connecting rod axis is in a second lateral position relative to the longitudinal cylinder axis.

29. The engine of claim 28, wherein the engine is configured such that the first rack gear engages the first crankshaft gear and the second rack gear engages the second crankshaft gear in an alternating manner.

30. The engine of claim 29, wherein the first rack gear engages the first crankshaft gear as the piston travels in the cylinder in a first direction toward the first and second crankshafts, and the second rack gear engages the second crankshaft gear as the piston travels in the cylinder in a second direction away from the first and second crankshafts.

31. The engine of claim 30, wherein the first rack gear engages the first crankshaft gear during a power stroke of the engine, and the first rack gear drives the first crankshaft, and wherein the second crankshaft gear drives the second rack gear.

32. The engine of claim 28, further comprising a first cam associated with the first crankshaft, the first cam being configured to act against the elongate portion of the connecting rod such that the second rack gear engages the second crankshaft gear.

33. The engine of claim 32, further comprising a second cam associated with the second crankshaft, the second cam being configured to act against the elongate portion of the connecting rod such that the first rack gear engages the first crankshaft gear.

34. The engine of claim 28, further comprising a stroke length control assembly configured to prevent the piston from traveling beyond at least one of the stroke termination points within the cylinder.

35. The engine of claim 34, wherein the connecting rod comprises a connecting rod follower, and the stroke length termination assembly comprises a stroke length cam, and wherein the connecting rod follower and the stroke length cam are configured to engage one another such that the piston is prevented from traveling beyond the at least one stroke termination point.

36. The engine of claim 35, wherein the stroke length cam is an internal cam defined by a groove.

37. The engine of claim 28, wherein a moment arm between the connecting rod and the longitudinal axis of the first crankshaft remains constant regardless of the position of the piston as the piston travels toward the first and second crankshafts.

38. The engine of claim 28, wherein the first and second crankshafts rotate in the same direction.

39. An internal combustion engine comprising:
a cylinder block defining a cylinder;
a crankshaft rotatably received by the cylinder block, the crankshaft comprising a crankshaft gear and being configured to rotate along a longitudinal axis of the crankshaft;
a piston configured to reciprocate within the cylinder between spaced stroke termination points defining a stroke of the piston; and
a connecting rod operably coupled to the piston, the connecting rod comprising an internal gear defining an aperture,
wherein the crankshaft is received in the aperture of the internal gear such that the crankshaft gear engages the internal gear,
wherein the engine further comprises a retainer assembly operably coupled to the crankshaft and the connecting rod, the retainer assembly being configured to maintain engagement between the crankshaft gear and the internal gear of the connecting rod,
wherein the connecting rod comprises a ridge around the aperture defined by the internal gear of the connecting rod, and
wherein the retainer assembly further comprises a follower configured to follow the ridge as the crankshaft rotates and the internal gear of the connecting rod orbits around the crankshaft.

40. A power train comprising:
the engine of claim 39;
a transmission operably coupled to the engine; and
a drive member configured to perform work, the drive member being operably coupled to the transmission.

41. The power train of claim 40, further comprising:
a generator configured to convert rotational power into electrical power, the generator being operably coupled to the engine; and
a power storage device configured to store electrical power, the power storage device being operably coupled to the generator,
wherein the transmission comprises an electric motor.

42. An internal combustion engine comprising:
a cylinder block defining a cylinder;
a crankshaft rotatably received by the cylinder block, the crankshaft comprising a crankshaft gear and being configured to rotate along a longitudinal axis of the crankshaft;
a piston configured to reciprocate within the cylinder between spaced stroke termination points defining a stroke of the piston; and
a connecting rod operably coupled to the piston, the connecting rod comprising a gear configured to engage the crankshaft gear,
wherein the gear of the connecting rod engages the crankshaft gear as the piston travels in the cylinder in a first direction toward the crankshaft, and the gear of the connecting rod disengages from the crankshaft gear as the piston reaches one of the stoke termination points.

43. A power train comprising:
the engine of claim 42;
a transmission operably coupled to the engine; and
a drive member configured to perform work, the drive member being operably coupled to the transmission.

44. The power train of claim 43, further comprising:
a generator configured to convert rotational power into electrical power, the generator being operably coupled to the engine; and
a power storage device configured to store electrical power, the power storage device being operably coupled to the generator,
wherein the transmission comprises an electric motor.

45. An internal combustion engine comprising:
a cylinder block defining a cylinder having a longitudinal cylinder axis;
a first crankshaft rotatably received by the cylinder block, the first crankshaft comprising a first crankshaft gear and being configured to rotate along a first longitudinal axis of the first crankshaft;
a second crankshaft rotatably received by the cylinder block, the second crankshaft comprising a second crankshaft gear and being configured to rotate along a second longitudinal axis of the second crankshaft;
a piston configured to reciprocate within the cylinder between spaced stroke termination points defining a stroke of the piston; and
a connecting rod operably coupled to the piston and having a longitudinal connecting rod axis, the connecting rod comprising:
a first gear configured to engage the first crankshaft gear, and
a second gear configured to engage the second crankshaft gear,
wherein the first gear of the connecting rod engages the first crankshaft gear during a power stroke of the engine, and the first gear of the connecting rod drives the first crankshaft,
wherein the second crankshaft gear drives the second gear of the connecting rod, and
wherein the engine is configured such that the first gear of the connecting rod is configured to engage the first crankshaft gear when the longitudinal connecting rod axis is in a first lateral position relative to the longitudinal cylinder axis, and the second gear of the connecting rod is configured to engage the second crankshaft gear when the longitudinal connecting rod axis is in a second lateral position relative to the longitudinal cylinder axis.

* * * * *